(12) United States Patent
Meghlaoui

(10) Patent No.: US 6,609,119 B1
(45) Date of Patent: Aug. 19, 2003

(54) INTELLIGENT PROCESS CONTROL USING PREDICTIVE AND PATTERN RECOGNITION TECHNIQUES

(75) Inventor: Abdelhamid Meghlaoui, Dubai (AE)

(73) Assignee: Dubai Aluminium Company Limited, Dubai (AE)

( * ) Notice: Subject to any disclaimer, the term of this patent is extended or adjusted under 35 U.S.C. 154(b) by 0 days.

(21) Appl. No.: 09/335,062

(22) Filed: Jun. 17, 1999

Related U.S. Application Data

(63) Continuation-in-part of application No. 08/844,389, filed on Apr. 18, 1997, now abandoned.
(60) Provisional application No. 60/040,527, filed on Mar. 14, 1997.

(51) Int. Cl.[7] ................................................. G06N 3/02
(52) U.S. Cl. ........................ 706/25; 204/400; 204/435
(58) Field of Search ................................ 204/400, 435; 205/336; 706/23

(56) References Cited

U.S. PATENT DOCUMENTS

| | | | |
|---|---|---|---|
| 3,658,979 A | 4/1972 | Dunn et al. ............... 264/176 F |
| 3,793,041 A | 2/1974 | Sowman ...................... 106/57 |
| 3,795,524 A | 3/1974 | Sowman ...................... 106/65 |
| 4,012,213 A | 3/1977 | Haggerty et al. .............. 65/13 |
| 4,030,901 A | 6/1977 | Kaiser ............................ 65/2 |
| 4,047,965 A | 9/1977 | Karst et al. ................... 106/65 |
| 4,421,721 A | 12/1983 | Byer et al. |
| 4,450,063 A | * 5/1984 | Johnston et al. ............. 204/400 |
| 4,473,386 A | 9/1984 | Strickland ........................ 65/1 |
| 4,546,811 A | 10/1985 | Potard ........................ 164/66.1 |
| 4,565,557 A | 1/1986 | Naumann et al. ................ 65/1 |
| 4,654,065 A | 3/1987 | Naumann et al. ................ 65/2 |
| 4,654,130 A | * 3/1987 | Tabereaux et al. .......... 205/336 |
| 4,766,552 A | 8/1988 | Aalbu et al. ................. 364/500 |
| 5,100,449 A | 3/1992 | Cornelius et al. ................ 65/2 |
| 5,111,531 A | * 5/1992 | Grayson et al. ............... 706/23 |
| 5,142,612 A | * 8/1992 | Skeirik ........................ 706/23 |
| 5,203,984 A | * 4/1993 | Sakai et al. ................. 204/435 |
| 5,215,688 A | 6/1993 | Williamson et al. .......... 264/14 |
| 5,282,261 A | * 1/1994 | Skeirik ........................ 706/23 |
| 5,516,481 A | 5/1996 | Ishizaki et al. ............. 264/443 |
| 5,552,213 A | 9/1996 | Eschner ...................... 428/283 |

FOREIGN PATENT DOCUMENTS

| | | | |
|---|---|---|---|
| FR | 80 16406 | 9/1984 | ............. C25C/3/20 |
| FR | 85 07319 | 6/1987 | ............. C25C/3/20 |

OTHER PUBLICATIONS

Hassoun, Mohamad H., Fundamentals of Artificial Neural Networks, p. 110, The MIT Press, Cambridge, MA, 1995.*
Rosenberg, Jerry M., Dictionary of Artificial Intelligence & Robotics, p. 138, John Wiley and Sons, New York, New York, 1986.*

(List continued on next page.)

Primary Examiner—Wilbert L. Starks, Jr.
(74) Attorney, Agent, or Firm—George M. Carrera, Jr.; Gardner Carton & Douglas LLC

(57) ABSTRACT

A neural control logic scheme based on prediction and pattern recognition techniques is used to control electrochemical processes such as aluminum electrolytic cells. The predictive capacity of feedforward neural networks is used to predict the future values of decision variables to be used by the cell's control logic, enabling the control logic to apply anticipated actions to cells in different conditions, thus avoiding anode effects and improving cell stability. The pattern-recognition capacity of LVQ-type neural networks is used to provide a closed-loop control structure to the feeding of the cell as a function of cell resistance, alumina concentration and cell condition. The closed-loop control structure enables the cell to operate at a near-optimal regime regardless of the condition of the cell.

26 Claims, 16 Drawing Sheets

PREDICTIVE CONTROL SCHEME USING AN INTERNAL NEURAL MODEL

OTHER PUBLICATIONS

Raynor, William, The International Dictionary of Artificial Intelligence, p. 302, Glenlake Publishing Company, Ltd., Chicago, IL, 1999.*

Ling Ding; Junyi Li; Yugeng Xi, Generalized self–organized learning modeling and model predictive control for nonlinear plants, Industrial Electronics, Control, and Instrumentation, 1993. Proceedings of the IECON '93., International Conference on, 15–19 N, Nov. 1993.*

Schaffner, C.; Schroder, D., An application of general regression neural network to nonlinear adaptive control, Power Electronics and Applications, 1993., Fifth European Conference on, 1993, Page(s).: 219–224 vol. 4, Jan. 1993.*

Pham, Duc Truong et al, Neural Networks for Identification, Prediction, and Control, Springer–Verlag, 1995, pp. 7–9, Nov. 1993.*

"Application of Feedforward and Recurrent Neural Networks to Chemical Plant Predictive Modeling;" Lambert and Hecht–Nielsen; Dept. of Elec. & Computer En.; Univ. of CA; San Diego, CA, USA; IEEE, Copyright 1991; pp. I–373–I–378.

"Potential Applications of Neural Networks for the Control of Mineral Processing Plants;" Flament, Thibault & Hodoiun; GRAIIM, Dept. de Mines et Metallurgie, Univ. Laval, Quebec, Canada: presentation at the 29th Annual CIM Conf. of Metallurgists, Hamilton, Ontario, Canada; Aug. 26–30, 1990; pp. 1–22.

"LVQ_PAK The Learning Vector Quantization Program Package;" Version 2.1 (Oct. 9, 1992); Copyright 1991–1992 by Kohonen, Kangas, Laaksonen and Torkkola; LVQ Programming Team of the Helsinki Univ. of Technology, Lab. of Computer and Information Science, Rakentajanaukio 2 C, SF–02150, Espoo, Finland; pp. 1–24.

"SOM_PAK The Self–Organizing Map Program Package," Version 1.2 (Nov. 2, 1992); Copyright 1992 by Kohonen, Kangas and Laaksonen; SOM Programming Team of the Helsinki University of Technology, Lab. of Computer and Information Science, Rakentajanaukio 2 C, SF–02150 Espoo, Finland.

"Thermal Conductivity; X, Data for Several Pure Oxide Materials Corrected to Zero Porosity;" Kingery et al.; Jr. Amer. Ceramic Soc.; vol. 37, Nop. 2; Feb. 1954; pp. 107–110.

"Communications–Aerodynamic Levitation Technique for Containerless High Temperature Studies . . . ;" Winborne et al..; Metallurgical Transactions B; vol. 7B; Dec. 1976; pp. 711–713.

"Aero–Acoustic Levitation: A Method for Containerless Liquid–Phase Processing at High Temperatures;" Weber et al; Copyright 1994 Amer Institute of Phyusics; Feb. 1994; pp. 456–465.

Kuo, Benjamin C., "Automatic Control Systems: fifth edition", Prentice–Hall, Inc. pp. 257.

* cited by examiner

GRAPHIC ILLUSTRATION OF THE CONTROL LOGIC

SCHEMATIC VIEW OF AN ELECTROLYSIS CELL WITH PREBAKED ANODES

THE MASS BALANCE IN A REAL CELL:
CURVES: (a) FEED AND (b) ALUMINUM OXIDE CONCENTRATION IN REALITY

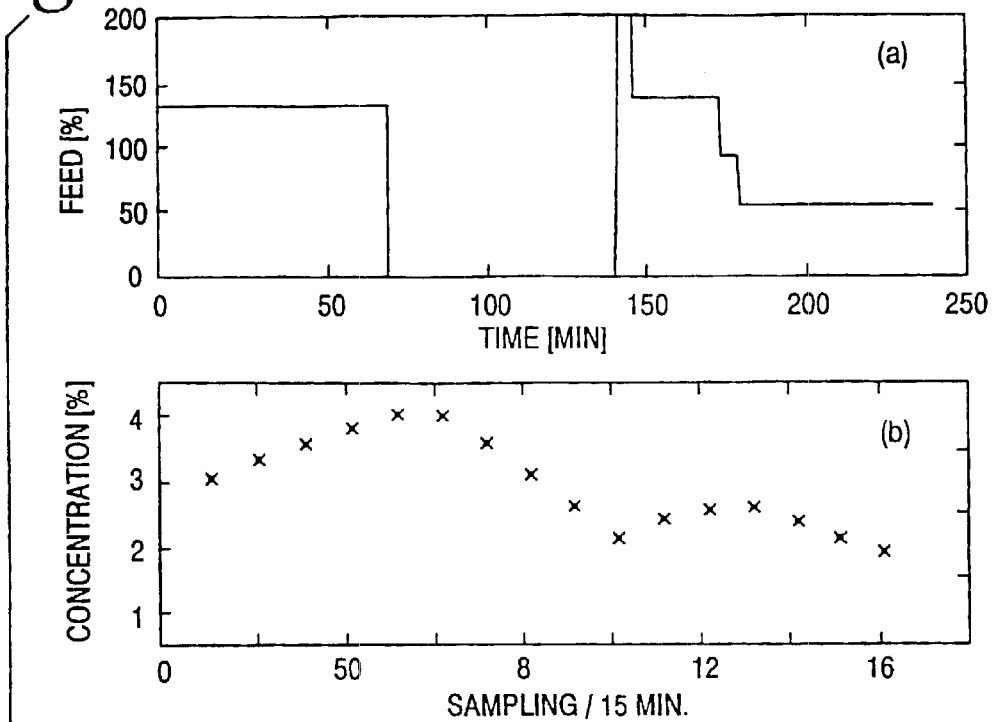
THE MASS BALANCE IN A SIMULATED CELL
CURVES: (a) FEED AND (b) ALUMINUM OXIDE CONCENTRATION IN SIMULATION
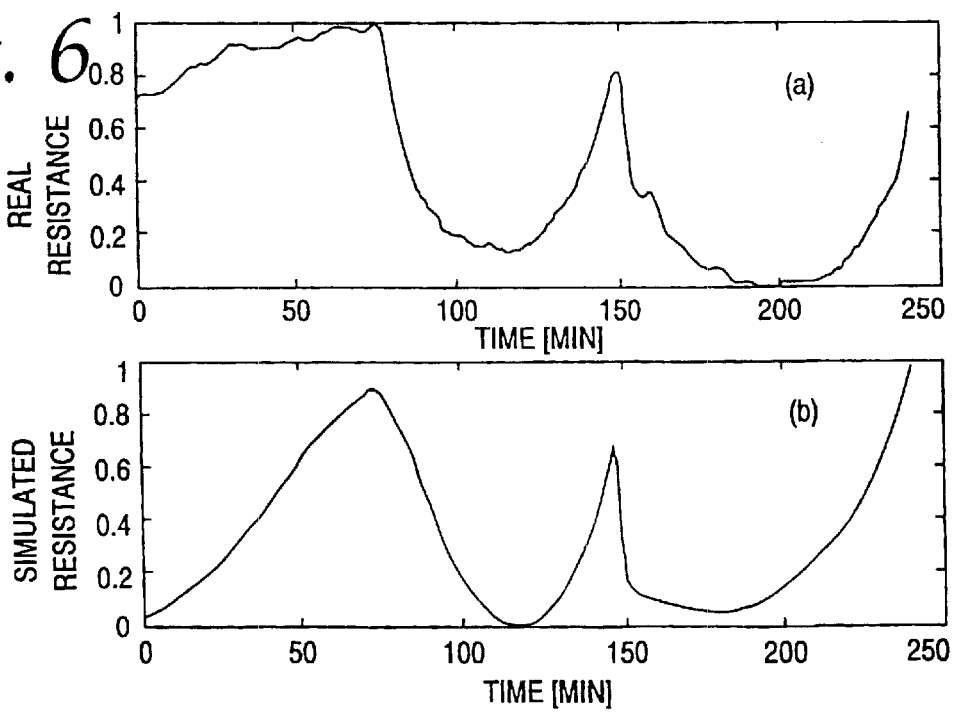
CURVES OF STANDARD REAL RESISTANCE (a) AND SIMULATED RESISTANCE (b)

SERIES-PARALLEL STRUCTURE OF THE PREDICTIVE NETWORK

ARCHITECTURE OF THE PREDICTED NEURAL MODE

NEURAL PREDICTION OF SIMULATED RESISTANCE. THE SIMULATION DATA
HAVE BEEN OFFSET BY 15 MINUTES TO BETTER VISUALIZE THE TWO CURVES

REAL-TIME PREDICTION OF CELL RESISTANCE 15 MINUTES INTO THE FUTURE,
BY THE NETWORK USING DATA FROM THE CELL

PREDICTION OF A TENDENCY INDEX BY A NEURAL MODEL

PREDICTIVE CONTROL SCHEME USING AN INTERNAL NEURAL MODEL

THREE TYPICAL CELLS STATES, EACH DESCRIBED BY ITS CHARACTERISTIC CURVE GIVING THE RELATION BETWEEN CELL RESISTANCE AND CONCENTRATION (NORMALIZED), SHOWING THE WAY AN ANODE EFFECT IS APPROACHED

CELL IN STATE 1 CONTROLLED BY STANDARD (a) AND NEURAL (b) LOGICS, NOMINAL ALUMINUM OXIDE DOSAGE (3.0 KG/STROKE). FR: SUPPLY FLOW, R: RESISTANCE, D: ANODE- CATHODE DISTANCE, C: CONCENTRATION, FA: ALUMINUM PRODUCED

SIMULATION OF THE CELL IN STATE 1, CONTROLLED BY STANDARD (a) AND NEURAL (b) LOGICS, REDUCED ALUMINUM OXIDE DOSAGE (2.4 KG/STROKE). EIGHT ANODIC EFFECTS IN (a) AND ONE IN (b).

SIMULATION OF A STATE 2 CELL UNDER REDUCED FEEDING WITH 2.4KG/DUMP, CONTROLLED BY (a) STANDARD LOGIC (b) NEURAL LOGIC. NEURAL LOGIC PREVENTS ANODE EFFECTS.

Fig. 17
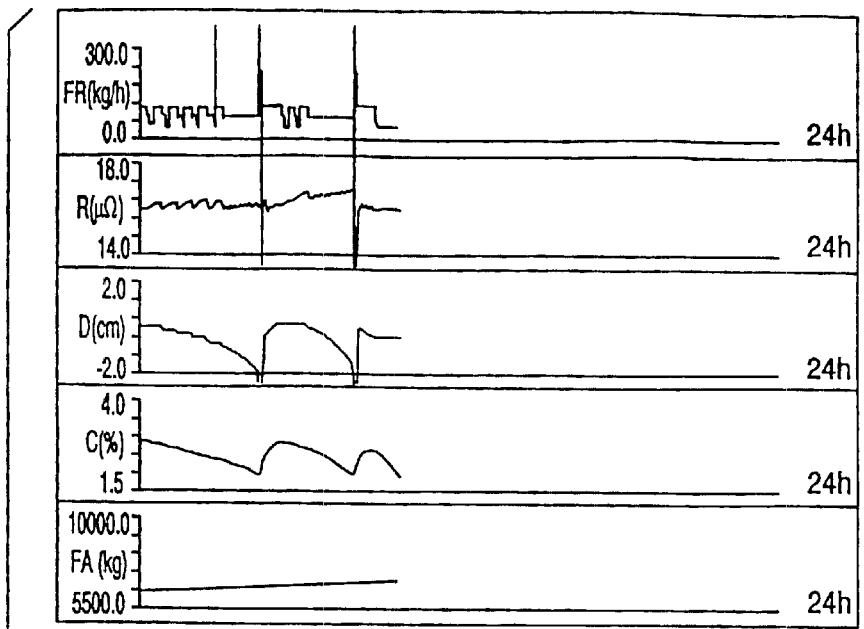
(a)
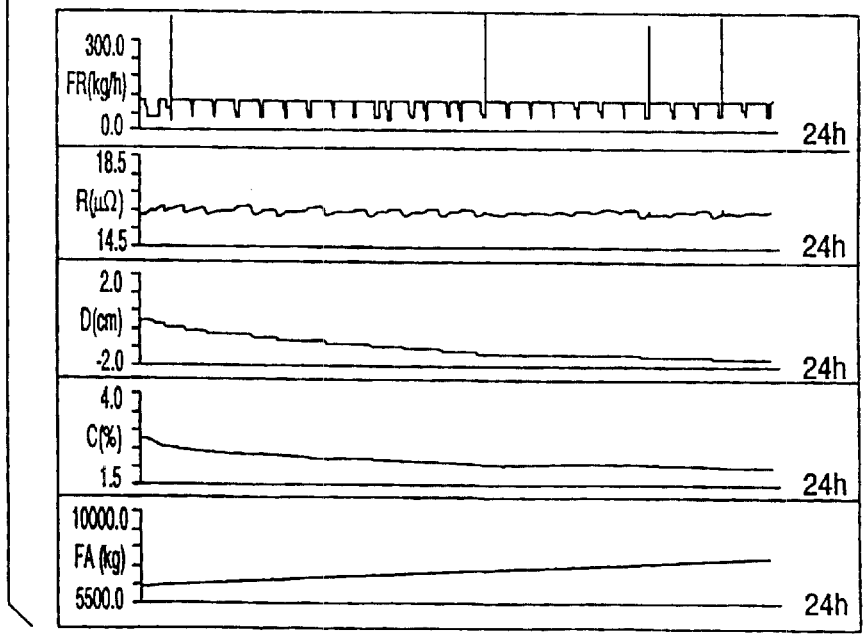
(b)
SIMULATION OF A STATE 3 CELL UNDER REDUCED FEEDING WITH 2.25KG/DUMP, CONTROLLED (a) STANDARD LOGIC (b) NEURAL LOGIC. NEURAL LOGIC PREVENTS ANODE EFFECTS.

Fig. 18
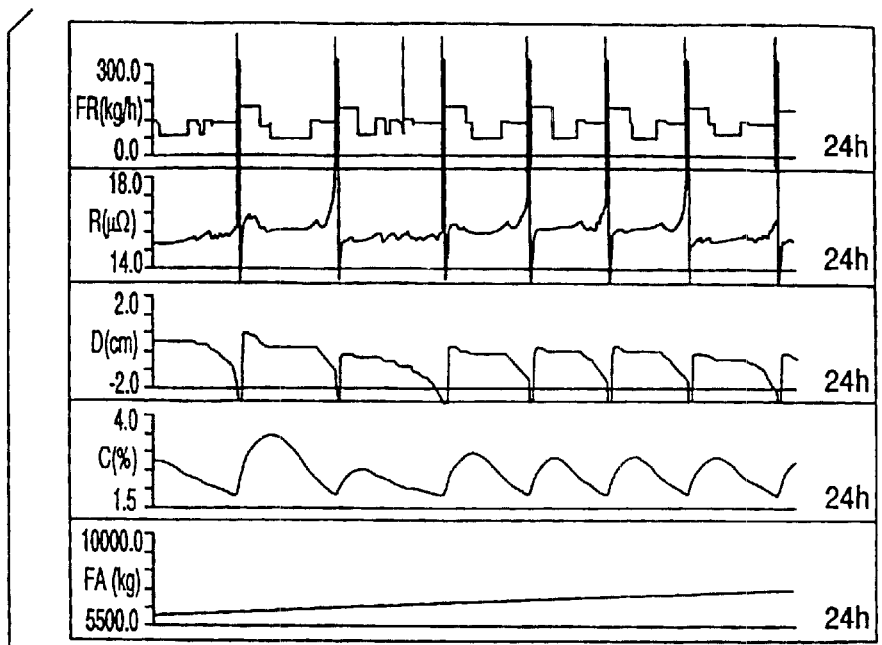
(a)
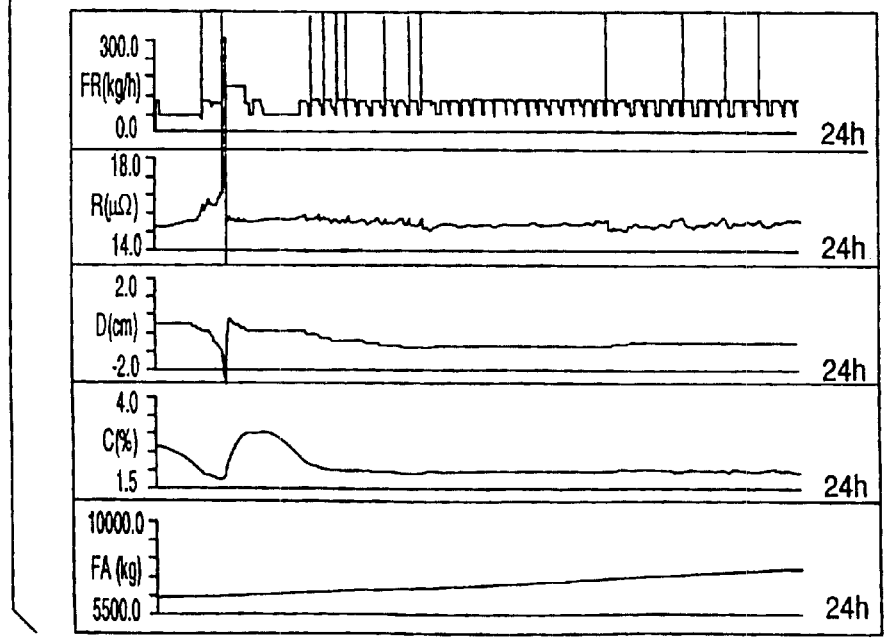
(b)
SIMULATION OF A STATE 1 CELL UNDER REDUCED FEEDING FREQUENCY AND FEEDING PERIODS, CONTROLLED BY (a) STANDARD LOGIC (b) NEURAL LOGIC. NEURAL LOGIC PREVENTS ANODE EFFECTS AFTER THE FIRST ONE.

SIMULATION OF A STATE 2 CELL UNDER REDUCED FEEDING FREQUENCY AND FEEDING PERIODS, CONTROLLED BY (a) STANDARD LOGIC (b) NEURAL LOGIC. NEURAL LOGIC PREVENTS ANODE EFFECTS.

SIMULATION OF A STATE 3 CELL UNDER REDUCED FEEDING FREQUENCY AND FEEDING PERIODS, CONTROLLED BY (a) STANDARD LOGIC (b) NEURAL LOGIC, WITH ADDITIONAL LEARNING. THE LATTER PREVENTS ANODE EFFECTS

THE THREE REGRESSION FUNCTIONS FOR THE THREE CELL STATES
(a) STATE 1, (b) STATE 2, (c) STATE 3.

THE SELF-ADAPTIVE TOPOLOGICAL MAP OF THE LVQ NETWORK MODEL

CELL IN STATE 1 CONTROLLED BY STANDARD AND NEURAL (lvq) LOGICS WITH VARIABLE DECISION CRITERIA CELL IN STATE 2, UNDER STANDARD CONTROL AND UNDER NEURAL CONTROL WITH VARIABLE DECISION CRITERIA, lvq (2a) AND lvq (2b)

CELL IN STATE 3, UNDER STANDARD CONTROL AND UNDER NEURAL CONTROL
WITH VARIABLE DECISION CRITERIA, IVQ (3a),lvq(3b) AND lvq (3c)

INTELLIGENT PROCESS CONTROL USING PREDICTIVE AND PATTERN RECOGNITION TECHNIQUES

CROSS-REFERENCE TO RELATED APPLICATIONS

This Application claims the benefit of pending U. S. Provisional Application No. 60/040,527, filed on Mar. 14, 1997, and is a continuation-in-part of U.S. application Ser. No. 08/844,389, filed on Apr. 18, 1997 now abandoned.

FIELD OF THE INVENTION

This invention relates in general to a method of controlling electrochemical processes through use of multiple neural networks trained in prediction and pattern recognition techniques. One particularly useful application of the invention is to use two neural networks to control, for example, electrolytic cells used in the production of liquid aluminum.

BACKGROUND OF THE INVENTION

For a number of processes, efficient control strategies are not used because the real-time measurement of certain crucial variables is either costly or difficult. In such instances, the variables may be estimated using virtual sensors around which different control strategies are developed. These sensors, and the resulting control strategies, can be developed based on neural networks. One example of such a control strategy development includes estimating the hardness variable (a major, non-measurable disturbance) in the grinding process of a mineral using a neural network. Other examples include: using neural networks to estimate the composition of a distilling column, the dissolution index in a polymer reactor and the biomass concentration in a fermentation system; using neural models to predict pH and fermenting time of a biologically active culture; and controlling a bio-reactor by using neural network models to estimate the biomass concentration from the continuous measurement of the flow of carbon dioxide combined with the dilution rate of the reactor.

An Overview of Neural Networks

Neural networks are computer programs that emulate the way the human brain processes information. Neural networks may be defined as computing systems which are made of a number of simple, highly connected processing elements, which processes information by its dynamic state response to external inputs. More specifically, a neural network is a network of several simple processors ("units" or "neurons"), each independent of the other, possibly equipped with local memory and connected by unidirectional transmission channels ("weights" or "connections"). These units operate in parallel on their local digital data and on the data received via the connections. The basic processing element, called an "artificial neuron," is modeled to mimic the characteristics of a biological neuron. Neural networks may be generally characterized by the following components:

A group of units for processing.
An activation function or a transfer function, for each unit.
A network architecture or topology. This is the way in which the units are laid out and connected one to the other.
A propagation rule by which the units' activities are propagated in the network.
An activation rule which allows the activity of each neuron to be updated.
An outside environment with which the network interacts.
A learning rule for updating the connections.

A single neuron can only perform elementary operations, but several neurons working together and organized as one or more layers can take up much more complex information processing tasks. Although all neural networks are constructed using artificial neurons as building blocks, neural networks can differ greatly in architecture and in learning rules. Neural network architecture includes elements such as the number of layers, the number of neurons in each layer, the shape of the activation function, and the way the layers are interconnected. The term "learning rule" refers to the process through which the network acquires the necessary knowledge by adapting the weights of its connections.

The Aluminum Electrolysis Process

Liquid aluminum is produced by dissolving alumina ($Al_2O_3$) reactant in a molten cryolite ($Na_3AlF_6$) bath, and decomposing it electrolytically to obtain liquid aluminum. A high-intensity, low-voltage, constant electric current passes through the electrolytic cell from the carbon anode to the bath, then on to the carbon cathode. The carbon cathode is built in the form of a receptacle to facilitate the gathering of the liquid aluminum produced. The oxygen freed by the electrolysis is drawn to the anode, and the anode is gradually consumed to produce carbon dioxide ($CO_2$). The consumable anode is a typical feature of the process.

In addition to cryolite, the bath usually contains various additives, mainly aluminum fluoride ($AlF_3$) and calcium fluoride ($CaF_2$), the purposes of which are to improve the physico-chemical properties of the bath and to lower its melting temperature.

A good control of the cell is required in order to maintain its operation close to the targeted main process variables. The most important of these variables are the cell resistance and the alumina concentration in the bath. The two are related through a characteristic curve giving cell resistance as a function of concentration. Depending on the condition (also called the "state") of the cell, this the shape of the characteristic curve may vary. The condition of a cell is determined by a number of elements describing the operation of the cell, such as, for example, the thermal condition, present alumina concentration, and the stability of the cell. Because the relative importance of each of these elements cannot be weighed independently, the combination of elements making up the condition of the cell may be described alternately herein as the "cell condition" or "cell state."

To be efficient, the control of alumina feeding of the electrolytic cell must be based on cell resistance, alumina concentration and cell state. A too high concentration of alumina may lead to the formation of "sludge," an undissolved slurry that is difficult to remove and causes inefficiencies in the current distribution in the cathode, thus disturbing cell operation. A too low concentration of alumina may trigger an "anode effect," an undesirable event characterized by a rapid buildup of the gas layer below the anode-bath interface. Anode effects increase cell resistance, causing cell voltage to increase rapidly. Anode effects can cause high power consumption, high bath temperature, production of carbon monoxide (CO) and carbon tetrafluoride ($CF_4$). The high bath temperature can cause a partial melting of the "freeze" (that outer part of the bath that solidifies along the cell walls, to help protect the cell walls against the highly corrosive cryolite) and consequently destabilize the thermal balance of the cell.

A stable energy balance helps to stabilize the bath temperature and freeze formation. If unstable, the freeze may melt or grow, both undesirable conditions. A good material balance helps keep the alumina concentrations at or near the optimal values.

The ideal operating point of the cell is where the alumina concentration and cell resistance are low. However, as alumina concentration is decreased, cell resistance increases rapidly. In order to avoid anode effects and their accompanying unfavorable conditions, it is of tantamount importance to carefully control both the cell resistance and the alumina concentration.

Control of the Aluminum Electrolysis Process

Operators usually control their cells through a controller that incorporates in coded form the theoretical and experimental knowledge of the process into a combination of software and hardware. Generally, the controller takes the cell current and cell voltage and generates the cell resistance, in addition giving information about the time rate of change of the cell resistance. From those decision variables, the controller takes actions to modify the anode position by adjusting the anode-cathode distance, or to change the alumina feed rate by varying the feeding frequency and the duration of the feeding periods.

Prior art non-neuron or "standard" control logics work by modifying the anode-cathode distance and adjusting the alumina feedrate frequency and duration However, various time lags are inherent in the process, such as the delay caused by the time required to dissolve the alumina in the bath. Due to such time lags, this control logic often cannot act in time to prevent the anode effects. In addition, the decision criteria of the standard control logic are fixed criteria, as such cannot be tied explicitly to alumina concentration or the cell condition.

These standard control schemes now in use are based only on cell resistance, and thus constitute an open-loop control means that lacks robustness because its decision criteria are not explicitly tied to cell state or alumina concentration. Under a open-loop control structure, in the presence of large disturbances, the cell drifts away from its optimal operating values and operates at either too low or too high alumina concentrations, potentially leading to anode effects or sludge formation, respectively. This results in non-optimal cell control, and decreased efficiency.

In addition, electrochemical cells experience amperage fluctuations around the nominal value, which can disturb the cell process and decrease cell performance. It is desirable to control the cell to minimize the effects of these perturbations, such as an increase in anode effect frequency, disturbances of heat and mass balances, and cell instability, among other deleterious effects. If, however, the control logic is efficient and the operating parameters of the cell (such as bath and metal heights, anode-cathode distance, base resistance as set point, chemistry, etc.) are correct, the cell will operate smoothly, and deleterious effects will be minimized. Efficient cell control allows the cell to operate more smoothly and at higher amperages, thus producing more metal.

Thus, it would be advantageous to improve standard control logic by using neural networks and predictive technique to predict future values of cell resistance and to identify the real-time condition of the cell, thus conferring to the control logic a predictive capability. It would also be advantageous to minimize the anode effects in electrolytic cells by taking appropriate feeding actions early enough in view of the various time lags, such as the delay caused by the time required to dissolve the alumina inside the bath. It would be further advantageous to have a means of preventing destabilizing events such as anode effects and sludge formation through control logic. It would also be advantageous to improve standard control logic by adding pattern-recognition control based on the identification of the condition of the cell and the estimation of the alumina concentration, thus conferring to the cell a closed-loop control structure which allows the cell to operate at a selected alumina concentration independent of its state. It would also be useful to improve standard control by adding predictive control based on cell resistance. Lastly, it would also be useful to use the condition of the cell and estimation of alumina concentration to provide a reliable deduction of the alumina concentration in the cell.

SUMMARY OF THE INVENTION

In this invention, a neural control logic scheme, utilizing both prediction and pattern-recognition networks, has been devised and applied to the control of electrochemical cells, such as aluminum electrolytic cells. Efficient cell control requires the knowledge of predicted values of the decision variables in order to enable the cell controller to take anticipated actions to minimize destabilizing anode effects during cell operation. Efficient cell control also requires knowledge of the reactant (such as alumina) concentration in order to adapt the decision-making criteria of the cell such that the cell operates at a near-optimal regime independently of the condition of the cell.

This invention, in contrast to prior art conventional control, provides an intelligent efficient control scheme utilizing both predictive and pattern-recognition methods through multiple neural networks which operate to reduce deleterious effects in the cell and optimize the efficiency of the cell. As defined herein, "conventional" control shall mean non-neural control and control using a single algorithm and single neural network.

In the preferred embodiment (an aluminum electrochemical cell), the predictive capacity of a feedforward neural network is used to predict cell resistance and its rate of change over time, which is then applied to the control logic of the cell. The predicted values are used to generate anticipated control actions to be applied to the cell at different cell states, in order to avoid the anode effects induced by either reduced amounts of alumina injected by dump or reduced feeding frequency and duration.

Performances of the standard control logic and the neuro-predictive control logic were compared through results obtained from computer simulations, showing the efficiency of predictive control logic in suppressing anode effects as compared to standard methods of cell control. As a consequence, thermal stability is increased, power consumption is decreased and cell life is lengthened. Avoiding or reducing anode effects also results in reduction of harmful emissions such as fluorocarbon gases.

Next, the pattern recognition capacity of an LVQ neural network was used to identify the present condition, or state, of the cell on a real-time basis through the resistance versus concentration curve of the cell, from which the alumina concentration in the cell is deduced. The typical conditions of a cell were identified and each was associated with a set of triggers, collectively referred to herein as a "codebook." In contrast to convention control models, the neural logic of the invention utilizes one set of triggers for each typical cell condition, while conventional control utilizes a single set of triggers for all cell conditions. The selected triggers used for control in the method of the invention depends upon the real-time condition of the cell.

In the preferred embodiment of the invention (an aluminum reduction cell), the decision criteria for the feeding control logic are adapted to optimize alumina concentration, thus giving rise to a closed-loop cell control structure which enables the cell to operate at a near-optimal alumina concentration independent of the condition of the cell. This operation minimizes anode and other undesirable effects, allowing a more efficient control and better cell stability, which in turn help to increase the amperage and productivity of the cell.

The predictive and pattern-recognition techniques of the invention utilize neural network construction and training using past and present data specific to the process. After training and validation, these processors are then integrated with the cell control logic, which utilizes dual neural networks for a continuous and efficient process control logic which is more effective than conventional control methods.

BRIEF DESCRIPTION OF THE DRAWINGS

FIG. 5 is a graphical representation of the mass balance in a simulated cell.

FIG. 6 is a graphical comparison of the resistance obtained in real and simulated cells.

FIG. 17 is a graphical comparison of a simulation of a cell in State 3 controlled by neural and standard logic controls using a reduced aluminum oxide dosage.

FIG. 18 is a graphical comparison of a simulation of a cell in State 1 under reduced feeding frequency and feeding periods, controlled by neural and standard logic controls.

DETAILED DESCRIPTION OF THE PREFERRED EMBODIMENTS

Figure 1:
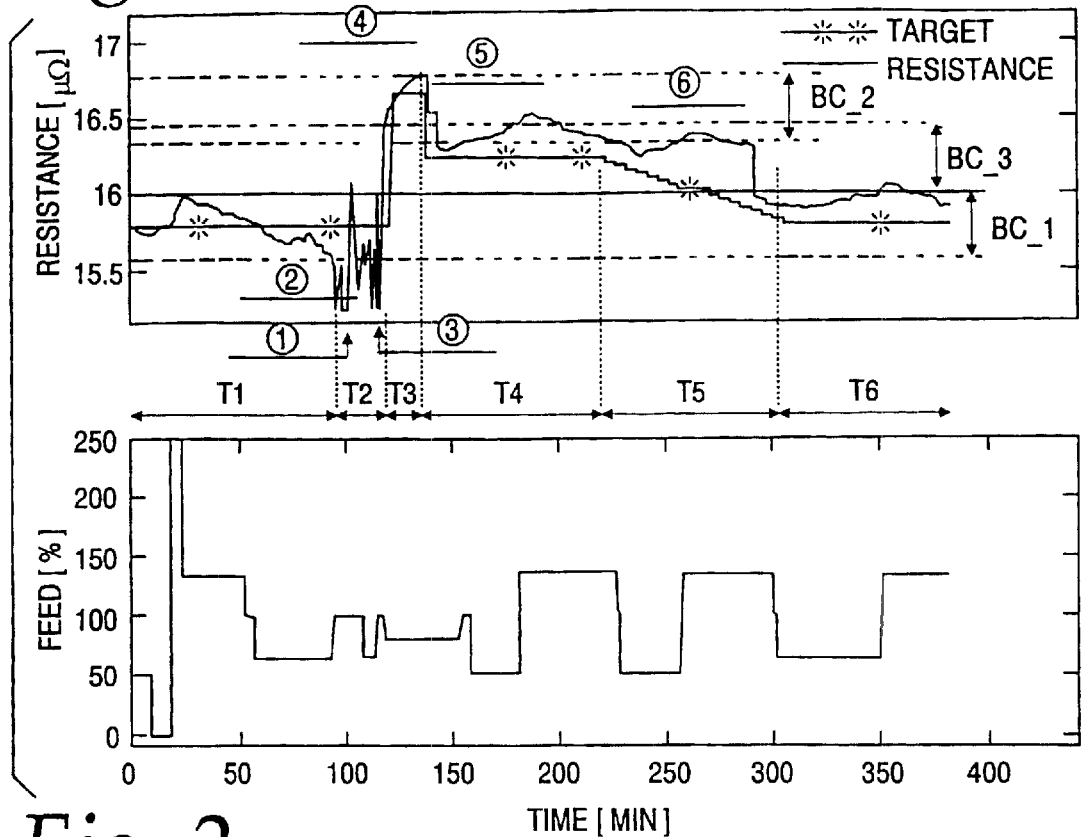
FIG. 1 is a graphical illustration of the control logic.

An efficient control of the cell requires the knowledge of predicted values of the decision variables in order to enable the cell controller to take anticipated actions to prevent or minimize the anode effects, which are destabilizing events often occurring during cell operations.

In this invention, an intelligent control scheme is implemented based on two separate and distinct processes: First, the cell resistance and its time rate of change are predicted ahead of time using a feedforward predictive neural network and applied to the cell control means to prevent anode effects. Results obtained from a cell simulator show that with the predictive control of the invention, most anode effects are avoided, thus conferring upon the cell an increased cell stability and decreased power consumption. Second, pattern recognition techniques are used within a separate neural network to recognize cell state, or condition, through pattern identification of the characteristic curve of the cell. Utilizing on state recognition and the resistance of the cell, the alumina concentration in the cell may be deduced. The decision criteria for the feeding control logic are then adapted to control the alumina concentration in the cell, thus giving rise to a closed-loop cell control structure.

The two stages of control of the invention complement each other by applying the same technology to improve cell control at two different levels: predictive control for short-term periods of a few minutes, and pattern-recognition closed-loop control for the feeding of the cell based on its alumina concentration, the knowledge of the latter being deduced from the operational state of the cell through recognition of characteristic curve patterns. One of the points of novelty of the invention is the ability of the neural network of the invention to combine predictive and pattern-recognition control, resulting in intelligent and robust cell control.

The predictive control, based on the prediction of cell resistance and resistance variations, is a statistical method derived from the statistical behavior of the cell, using past measured data to predict future values. In contrast, the pattern-recognition control, based on the recognition of the cell's present operational state, is a deterministic method utilizing the typical behavior of the cell. The pattern recognition control of the invention first defines the cell states, then recognizes the state of the cell at a given point in time and subsequently adapts the feeding criteria to the prevailing cell state. This method of control continues until a major perturbation occurs in the cell, such as an anode effect, at which time an update of cell state is carried out. The novel combination of both approaches results in a smooth and continuous real-time control of the cell.

We have tested the preferred embodiment described herein using three different cell conditions using random disturbances. Surprisingly, we have found that when a predictive neural network is integrated in the control logic, the cell reacts better to the stochastic perturbations by avoiding most of anode effects, while a cell controlled by standard logic cannot avoid them. In addition, when a pattern recognition neural network is integrated in the control logic, the cell can operate at or near optimal alumina concentrations independent of its state, or condition. The dual-network control methods of the invention permit the cell to operate at or near optimal alumina concentrations, independent of its cell condition, generally at an increased amperage over current technology, allowing the cell to be more efficient and to produce more metal. Thus, the efficient, multiple neural network control methods of the invention provide considerable advantages as compared to standard, open-loop control.

Cell control operates under the following fundamental concepts:

Ensuring a steady aluminum oxide content within a narrow interval (1.2%–3.0%) by modulating the pace at which aluminum oxide is introduced according to the cell's resistance trend during predetermined time intervals, by alternating the aluminum oxide under-feed and over-feed phases in relationship to the pace corresponding to the cell's rated consumption.

Moving the anodes to bring the resistance back within the admissible limits and better managing the cell's energy balance.

The main part of the control logic, which essentially handles managing the feed, the energy and the instability, is implemented by the following processes:

Signal analysis

Feed control

Resistance control

Instability treatment

Anodic effect treatment

FIG. 1 is divided into six periods to which will be referred to in the explanation of the control processes. The target is distinguished from the measured resistance by an asterisk. It is assumed that the measured resistance varies around the target within the control band:

BC_1 during periods T1, T2, T6

BC_2 during period T3

BC_3 during periods T4 and T5

The arrows (pointing up and down) represent the movements (upward and downward) of the anodes. The X-axis, common to both graphs, represents the time in minutes, and the Y-axes represent the resistance and the aluminum oxide feed as a percentage of the rated frequency.

Signal Analysis Processes

The voltage and amperage of the cell are collected and filtered at each sampling period during a one-second duration. The cell's resistance is then calculated using Equation (1):

$$R = \frac{v - v}{I}$$

An average voltage is calculated at regular time intervals, then compared to the anodic effect detection voltage $V_{ea}$. If the cell's voltage is greater than or equal to the admissible limit $V_{ea}$, the analysis process declares that the cell's state is under anodic effect and activates the automatic anodic effect suppression process. The mobile average of the cell's resistance (R) serves for evaluating two resistance trend indices. The first index, called δR, is the slope of the variation of the resistance calculated at equal time intervals. The first index tells us about the cell's rapid dynamic. The second index, called ΔR is calculated on the basis of the current average value and the minimal average value sought in real time during tracking of the resistance or observation of the cell. During this one-minute cycle, called the "control cycle," the control logic manages the aluminum oxide feed and the cell's stability. At each control cycle, the range of variation $R_{rang}$ of the resistance is calculated as the difference between the maximum value $r_{max}$ and the minimum value $r_{min}$ of this cycle. At each "action cycle," made up of several consecutive control cycles, the process verifies if several $R_{rang}$ values are higher than the limit value. If this is the case, the cycle is deemed unstable and the instability treatment process is activated. The resistance of the action cycle $R_{moy}$ is defined as the mobile average of the resistances of a finite number of control cycles. It is compared to the instruction value (target) $R_o$ in order to control the resistance through moving the anodes.

Feed Control Process

The control logic analyzes the cell and evaluates its aluminum oxide level by observing the resistance's trend. At each control cycle, in normal operating mode, the logic goes through the following phases:

Verifying the observation conditions.

Activating the under-feed regime and calculation of the δR and ΔR trends.

Comparing the δR and ΔR values to the respective instruction values.

Verifying the decision-making criteria to activate an over-feed regime.

Resuming another observation cycle to see if the observation conditions are met.

The observation conditions are characterized by cell stability, an absence of anodic effect and over-feed regime, and a resistance value located within the control band. The under-feed regime, also known as the "slow segment," is characterized by its low frequency in relationship to the rated value. Its duration is not predetermined. It remains activated as long as the decision-making criteria regarding activation of the "fast segments" are not verified due to the approach of an anodic effect. The over-feed regimes, or fast segments, are characterized by frequencies and durations that are predetermined by the control logic and that vary depending on the reason for which they were activated. The instruction values of the δR and ΔR trend indices are fixed, thus the rigidity of the decision-making criteria and the lack of strength of the existing control logic.

The period T1 in FIG. 1 shows the cell under observation, its resistance evolves within the control band BC_1. After the feed is stopped, probably at the operator's request in order to estimate the bath's aluminum oxide concentration, the resistance increases progressively until its slope δR exceeds the instruction value, in this case, after t≈20 min. The control logic then activates the two fast segments of different frequencies and durations. Under the effect of the aluminum oxide, the resistance decreases, the slope becomes negative and the control logic activates the under-feed regime. At the end of period T1, in spite of the under-feed regime, the resistance continues to decrease. This behavior is abnormal because it should increase. This abnormal behavior translates into the period of instability (T2) which will follow. Thus, a series of changes are made to the instructions in order to stabilize the cell (T3 through T5). After stabilization (period T6) of the cell, the target becomes equal to its stationary value and the resistance once again evolves within the control band BC_1. The under-feed regime activated at the beginning of period T6 causes an increase in the slope δR, and consequently, triggers a fast segment. Because of the system's inertia, the resistance continues its course progressively and crosses the upper limit of the control band. In order to prioritize cell control through aluminum oxide feed, the control logic does not generate a downward movement. Indeed, under the effect of the aluminum oxide, the resistance decreases progressively and another resistance observation cycle is repeated, alternating the under-feed and over-feed regimes.

Resistance Control Process

The cell's voltage can be rapidly increased or decreased, and consequently, so can its resistance, by raising or lowering the anode. The resistance control consists of generating the anode movements, that is to say of changing the distance between the anode and the cathode in order to bring the resistance back within the permissible limit and to adequately manage the energy supplied to the cell. A control band, also known as a "dead zone" ($R_o \pm \Delta r$) is defined around the instruction value $R_o$ where anode movements cannot be given. This restriction allows priority to be given to cell control with the help of the rate of introduction of aluminum oxide into the bath. The movements of the anodes are given during the action cycle; their duration is generally proportional to the variance between $R_{avg}$ and the instruction $R_o$. As can be seen at the end of period T2 of FIG. 1, the resistance target changes in the event of cell instability. To better manage the cell's energy balance, certain constraints as to duration and permission for these movements are imposed in the resistance control Process. The downward movements are not allowed, for example, during an unstable cycle. Movements (1, 2, 3), generated by the control logic during the period of instability (T2) are upward movements.

Instability Treatment Process

An excessive aluminum oxide content creates the risks of producing aluminum oxide deposits (sludge) which can form plates, which electrically insulate the cathode. This leads to the creation of very strong horizontal currents in the metal of the cell which, through interaction with the magnetic fields, agitate the metal and cause instability in the bath-metal interface. The cell is deemed unstable if the last values of $R_{rang}$ are greater than the limit value or if the $R_{avg}$ resistance of the action cycle reacts abnormally after anode movements. If one of these two conditions is verified during cell analysis, the control logic activates the instability treatment process (period T2) which is summarized as:

Moving the (permanent) resistance target one or several stages higher depending on the degree of instability of the cell (T3). Temporary values of the resistance target are thus obtained, that are proper to each stage. The control band is also moved around these temporary values of the target (BC_1, BC_2, BC_3, BC_1).

Ending the fast feed segment in progress or activate one of predetermined frequency and duration if the condition ΔR are met.

Activating a slow segment, the frequency of which depends on the stage in progress and the duration of which will extend until the end of the period of instability for this stage.

After stabilization of the resistance on a given stage level, progressively decreasing the target until the permanent target value is reached.

A stage corresponds to a fixed voltage or resistance value. The number of stages to be added depends on the difference ($R_o - R_{avg}$), that is to say the degree of instability. However, for better management of the cell's energy balance, the number of stages to be added is limited. Tracking the resistance trend is normally done at the different stages if the observation conditions are met.

The resistance reacted to the upward movement (3), the Process then moves the target to stage 2, the position of the control band to BC_2, and it activates an under-feed regime (period T3). This latter is activated because no over-feed regime is in progress and the conditions for activating one are not all present. When the resistance has stabilized at this stage level, the Process once again moves the target to stage 1 and the position of the control band to BC_3. At the beginning of period T4, the control logic generates two downward movements (4, 5) to bring the resistance back within the new control band (BC_3). The tracking of the resistance trend on stage 1 is normally done within band BC_3. The under-feed regime in progress leads to the increase in the slope δR and, consequently, to the activation of a fast segment to bring the resistance within the control band. During period T5, the control logic progressively starts decreasing the target value until it reaches its permanent value. The resistance follows the evolution of the target under the effect of the alternating between slow and fast feed regimes and the downward movement of the anode (6).

Anodic Effect Treatment Process

A lack of aluminum oxide in the bath causes the appearance of the anodic effect, which is reflected by an abrupt increase in the cell voltage. In such a situation, the voltage can go from, for example, 4, to, for example, 30 or 40 volts. The control logic analyzes the cell's voltage at regular time intervals. The anodic effect is detected as soon as the voltage exceeds a certain measurement, for example, 7 volts. The control logic then activates the anodic effect treatment module, which can be summarized as:

A termination phase characterized by a limited series of downward movements.

A recovery phase characterized by upward movements proportional to the difference ($R_o - R_{avg}$).

A phase in which a series of fast feed segments of predetermined duration and frequency are activated.

The fast segments are triggered to compensate for the lack of aluminum oxide in the bath and the purpose of the anode upward and downward movements is to liberate the gasses which form during the anodic effect and which isolate the anodes.

Simulator Adaptation and Coupling to the Control Logic

The cell simulator simulates the different operating steps of a specific electrolysis cell or a prebaked anode cell. The simulator is made up of a model, a control emulator and a user interface:

The model is a model with lumped parameters which describes the main parts of an electrolysis cell. Because of its modular structure, it can be adapted to different types of cells.

The control emulator is rather like a hierarchically organized control system. In its general form, it only simulates elementary control actions. The choice is left up to the user to integrate his/her own control system.

The graphical interface offers the possibility of conducting simulations, printing the numerical and graphical results and simulating different modes of the cell's operation.

The user may specify the type of cell, the geometry and the number of pieces of information necessary to realize a likely simulation.

Dynamic Cell Simulator (DCS)

Aluminum electrolysis is a fairly complex electrochemical process. Certain internal reactions are not yet adequately understood. There are several types of cells in existence in the world for making aluminum. These cells differ in the type of anodes (Soederberg or prebaked), the dimensions, geometry, disposition of the omnibus bars transmitting the electrical current from one cell to another, the choice of construction materials, etc.

Figure 2:
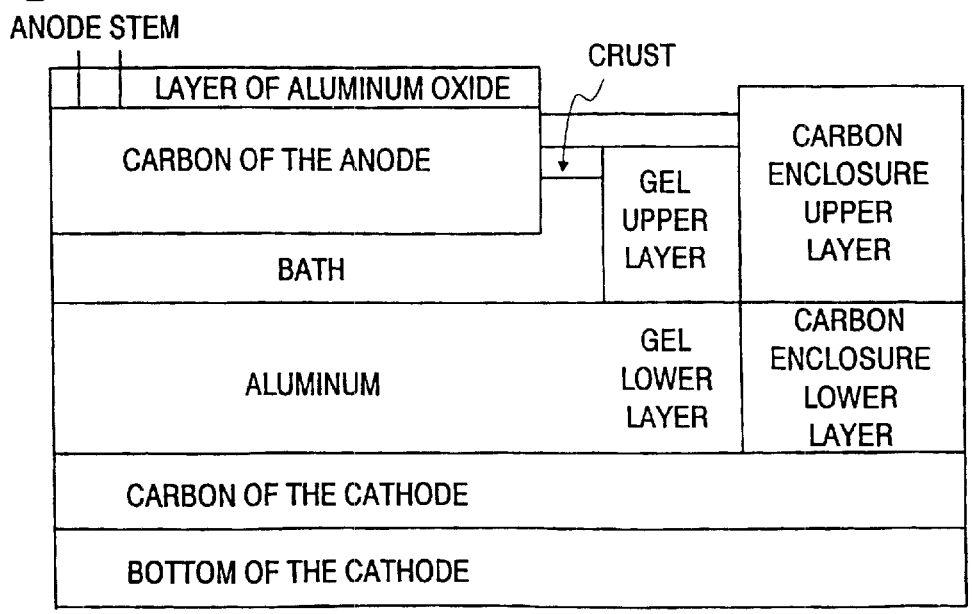
FIG. 2 is a schematic view of an aluminum electrolysis cell with prebaked anodes.
Figure 3:
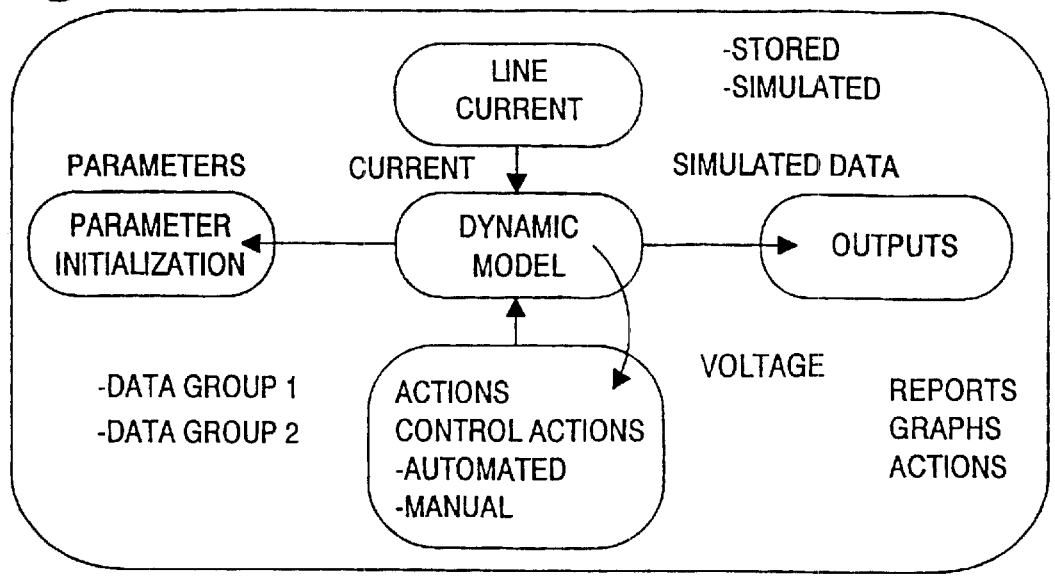
FIG. 3 is a graphical representation of the modular organization of the Dynamic Cell Simulator of the invention.

The cell simulator is organized in the shape of a shell that integrates all the required modules (cell model, current source, control system, manual operations) in order to simulate the different operating modes of a real cell. The structure of a real electrolysis cell is shown in FIG. 2. FIG. 3 provides a diagrammatic view of the modular structure of the Dynamic Cell Simulator (DCS). After adapting and validating the model to a real cell, the DCS was used to study the electrolysis process and to compose scenarios representing normal or special cell situations, or to develop new control strategies. In this case, a new control strategy was developed based on prediction and state recognition of the cell using neural networks.

Model Validation in Static Mode

There are two groups of real data that constitute the corner stones of validation of the model in static mode: the measurements for the voltage and energy balances. The results calculated by the simulator are compared to the factory measurements and conclusions are drawn in light of later adjustments to the model.

Voltage Balance

The basic voltage balance includes the following measurements:

- the line current
- the total voltage of the cell
- the voltage drop in the outside conductor elements
- the voltage drop in the anode
- the voltage drop in the cathode
- the voltage drop in the electrolyte.

A detailed voltage balance specifies the drops in voltage in the anode and cathode assemblies. By implying other process parameters, the anode and cathode over-voltages, the electrolysis potential, the voltage drop in the gas layer can also be calculated. Table (1) gives a typical voltage balance for a modern cell and for the one obtained with the simulator.

The user must verify the detailed report of the static part of the DCS and compare the calculated and measured voltage balances. Generally, the DCS' precision in approximating the composition of the voltage via the default equations integrated in the sub-models is good.

TABLE 1

Balance in % of the Simulated and Measured Voltages

| Components | Reference | Simulated |
|---|---|---|
| Electrolysis potential | 40.6 | 40.6 |
| Voltage drop in the anode | 9.2 | 9.2 |
| Voltage drop in the cathode | 6.1 | 6.1 |
| Voltage drop in the electrolyte | 37.7 | 37.7 |
| Cell voltage | 93.6 | 93.6 |
| Outside voltages | 6.4 | 6.4 |
| Total cell voltage | 100 | 100 |

It should be noted that:

(1) The equations integrated into the simulator provide directly the sum of the electrolysis potential and the anode over-voltage.

(2) The voltage drop in the bus bars can be included in the voltage of the anode or of the cathode or can be treated as external components.

(3) The contribution of the anodic effect is neglected.

By combining the results obtained by simulation, the simulator reproduced with great precision the reference cell voltage balance.

Energy Balance

The energy balance of the cell is one of the major concerns in the design and operation of an electrolysis cell. About 45 to 50% of the energy produced is used for the production of aluminum. The energy balance is often summarized in a table where the losses of heat are localized in specific parts of the cell. Table (2) gives a typical distribution of the heat losses in an industrial cell.

The DCS offers several opportunities for adjusting and testing the energy balance in static mode. When all of the initial data is introduced, the DCS begins with a preliminary calculation of the heat flow between the volume elements. The results are gathered together according to the cell's superstructure. The user can verify the balance and make initial corrections in order to avoid unrealistic results.

TABLE 2

Distribution of Heat Losses in the Reference Cell

| Cell part | Loss (%) |
|---|---|
| Anode stem | 5.4 |
| Aluminum oxide on the anode | 25.5 |
| Crust | 2.9 |
| Apron | 12.9 |
| Lateral enclosure of the cathode | 35.1 |
| Bus bars of the cathode | 5.8 |
| Bottom of the cathode | 12.4 |

When the initial distribution of the heat flows is accepted by the user, the DCS starts the procedure of searching for the solution of the algebraic equations system describing the static state of the cell. It is at this stage that the user can compare the simulated terms and the calculated terms of the energy balance a n d the balance in general.

The comparison of Tables (2) and (3) shows that the distribution of heat losses in the reference cell and in the simulator are similar.

TABLE 3

Simplified Distribution of Heat Losses Given by the Simulator

| Cell part | Loss (kW) | Loss (%) |
|---|---|---|
| Anode stem | 21.8 | 5.6 |
| Aluminum oxide on the anode | 106.2 | 27.1 |
| Crust | 24.5 | 6.3 |
| Apron | 56.4 | 14.4 |
| Lateral enclosure of the cathode | 121.4 | 31.0 |
| Bus bars of the cathode | 21.1 | 5.4 |
| Bottom of the cathode | 40.3 | 10.3 |
| Total | 391.7 | 100.0 |

Validation of the Model in Dynamic Mode

The validation of the model in dynamic mode involves validating the mass balances, verifying the operating actions and integrating the control system.

Mass balance

The cell's mass balances are done on:

The aluminum oxide injected

The aluminum fluoride injected

The metal siphoned

The anode block withdrawn

The anode block introduced

These balances constitute the basis of the dynamic adjustment and the model validation. The DCS of the invention calculates and prints the internal mass balances. The terms of the mass balances should be compared on a daily and weekly basis. The simulated mass balances are close to those of the real cell.

Operating Actions

The operating actions can be ordered by the cell controller or by manual interaction from the operator. Neither the real cell nor the DCS can distinguish the source of the action. The list of operations is described above, as adjustable environmental components.

In preparing test and validation scenarios, it is important to program realistic events or events similar to those which have been scheduled in practice. It is up to the user to prepare the list of the events to be scheduled during the dynamic simulation.

Integration of the Control System

A real electrolytic cell is under automatic control. It is natural that the simulator is made up of a model of the cell and a control system. In the preferred embodiment of the present invention, programs from a real controller will be adapted and integrated into the simulator.

Validation of the Model and the Control Logic

Model verification and validation projects in dynamic mode are next presented. In order to demonstrate this subject, a particular operating period with real and simulated data is described. A specific experiment plan was developed to collect as much information as possible on modern cell dynamics. Three cells were selected that were assumed to be operating under normal conditions. The parameters of these cells were varied and the decision-making criteria of the control logic were varied in order to enrich them sufficiently in aluminum oxide and then make them poorer until appearance of the anodic effect. To obtain these cell states, the following operating conditions were alternated in this example:

An over-feed period of 3 hours in duration

A stoppage of the feed breakers, that is to say a period without any aluminum oxide feed, lasting 74 minutes A 37-minute period where the different feed regimes are activated by the control logic in normal operating mode A feed reduced by 50% of the rated value until appearance of the anodic effect.

During their operational periods, the line current, the voltage and the control actions generated are recorded by the control system. At a regular 15-minute interval:

Samples were taken from the bath in order to determine the $CaF_2$ and aluminum oxide concentration.

The bath temperature was measured.

The bath level and the metal level were measured.

Figure 4:
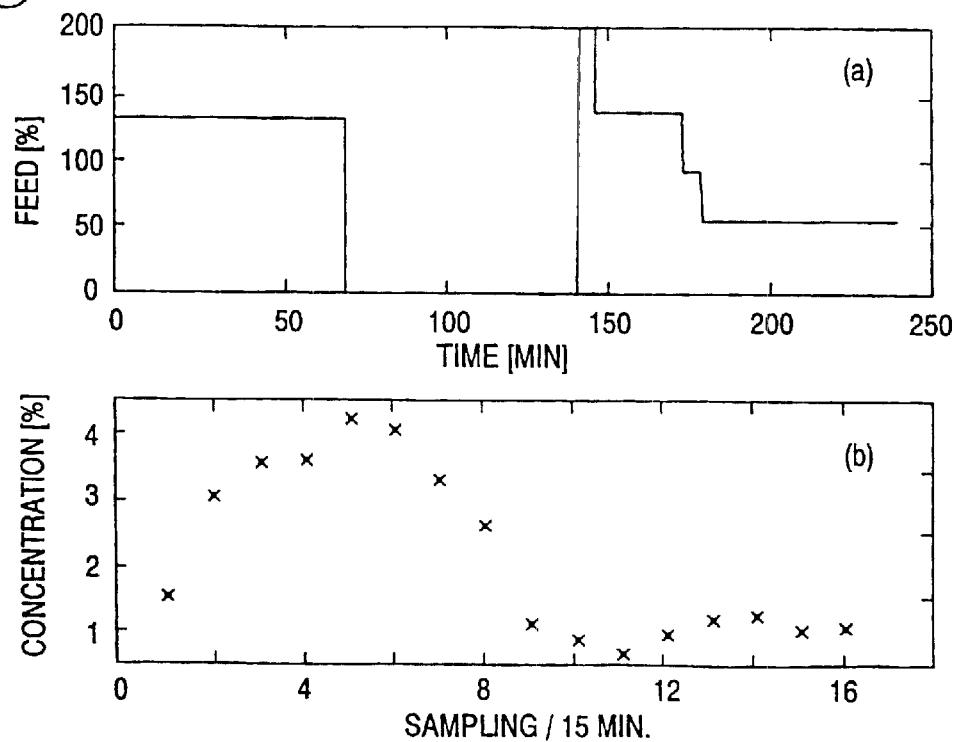
FIG. 4 is a graphical representation of the mass balance in a real cell.

In light of the laboratory results and the data recorded, several analyses were conducted. The curves of the variation in resistance, feed and aluminum oxide concentration are drawn to facilitate understanding of the dynamic adjustment of the model, because the latter had already been adapted in static mode. Pursuant to the procedure described previously, the mass balance was reproduced and the manual and automatic actions of the controller were scheduled. By incorporating appropriate control logic in the cell simulator, the mass balance of a real cell and the operating regimes based on experience on the cell simulator were imposed. FIGS. 4 and 5 illustrate the data of the experimental and simulated cells.

FIGS. 4(a) and (b) show the changes in the feed regime and the evolution of the bath's concentration in aluminum oxide in the real cell. The experiment starts with an over-feed period, followed by an observation period with a stoppage of the breakers, which, as the anodic effect approaches, is followed by strong over-feed regimes activated by the control logic in normal operating mode. Finally, the experiment ends with a 50% reduction of the rated value of the feed.

FIG. 4(b) shows the concentration curve of the bath of the experimental cell which clearly reflects the feed cycle. The concentration begins with a rising period, from a value much lower than the long-term operating average; reaches a maximum value of about 4.2% and decreases during the observation with stoppage of the breakers. The period of high over-feeds, which are activated by the control logic, allows the concentration to increase slightly. When the feed is reduced by 50%, the concentration progressively decreases until the anodic effect appears. FIGS. 5(a) and (b) show the same scenario obtained with the simulator. The diagram of the feed cycle is identical to that applied to the real cell because all of the actions of the real controller are repeated by the control module of the simulator. The simulated aluminum oxide concentration evolves in a manner similar to the measured one: increase to a maximum value—decrease during observation—slight increase during the period of high over-feeds—progressive decrease until the anodic effect. By comparing the concentration curves shown in FIGS. 4(b) and 5(b), and the resistance curves shown in FIGS. 6(a) and (b) one notes that the trends and shapes of these curves are qualitatively similar, but that the values differ. This quantitative difference is more easily noticed when comparing the increase and decrease slopes.

The simulator's initial condition values are those of the permanent regime, i.e., an aluminum oxide concentration of approximately 3.0%. This justifies the spread in the resistance and concentration values during the first 50 minutes.

The quantities of the bath, the freeze, the undissolved aluminum oxide in the cell during this study were estimated, although a better quantitative representation could be obtained by trial-and-error. The estimated values, however, are sufficient for purposes of practicing the invention.

The Predictive Network

Figure 7:
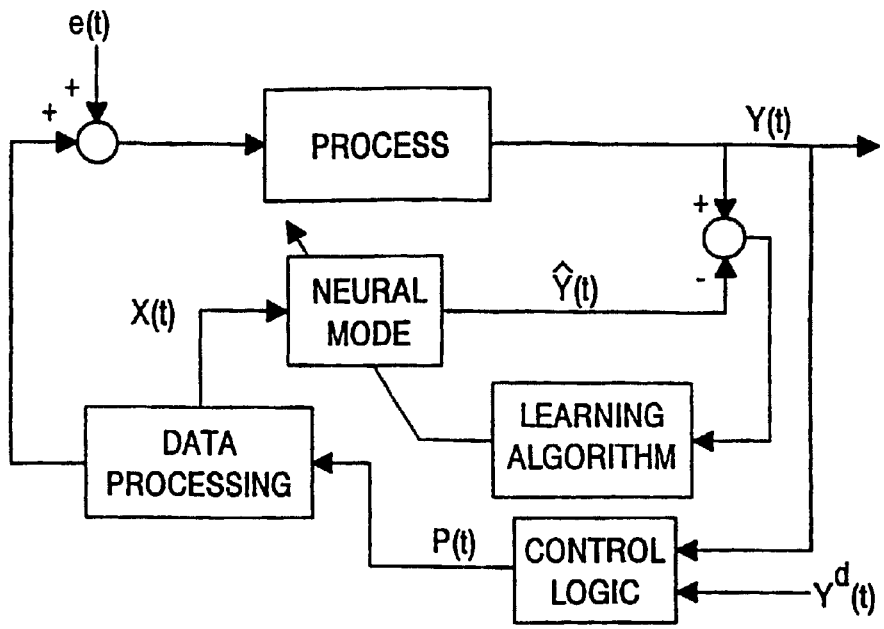
FIG. 7 is a schematic representation of the series-parallel structure of the predictive network of the invention.

To obtain a good predictive network, it is important to train the predictive network with data representative of the real process. Simulation studies show that learning with data taken randomly and covering the whole operational range yields better representativity and higher capability for generalization. If an empirical model is to be used in a closed-loop control scheme, the data acquisition for learning must be carried out under the same conditions. For this reason a series-parallel structure has been adopted for the predictive scheme in the preferred embodiment of the invention. In FIG. 7, X(t) represents the input to the network, the cell's own standard control logic generates the three decision variables and the control action U(t). The three decision variables are the cell resistance R and its two trend indicators related to the cell's slow and fast dynamics, respectively. For the fast dynamics, the trend indicator is taken as the cell resistance variation for the last short term (a few minutes) period whereas for the slow dynamics, it is the difference between the present average value of the resistance and the minimal average value sought in real time during tracking of the resistance. Note that although the terminology may vary, essentially those trend indicators are simply descriptors of the time rate of change of the resistance.

The three decision variables together with U(t) form the vector P(t) of variables produced by the control logic. In order to generate U(t), the feeding is deliberately perturbed by changing its frequency by a large percentage of its full range. As an example, if the maximum time interval between two consecutive point feedings is 200 seconds, perturbations will be created by imposing variations of a few dozen seconds.

To improve learning, it is necessary to create even larger variations of the cell resistance, in order to produce large amplitude signals, at the risk of triggering anode adjustments. But on the other hand, anode adjustments must be kept out of learning as they disturb the cell's energy balance and cause sudden changes in cell resistance, which impede the learning process. To obtain large variations in resistance without triggering anode adjustments, the resistance's deadband was enlarged, typically three to fourfold, thus taking the control logic to its maximum admissible limit. "Deadband" is the tolerance zone of the cell resistance value within which a resistance variation does not result in an anode adjustment. The deadband enlargement was done solely for the purpose of preventing anode adjustments during learning.

Figure 8:
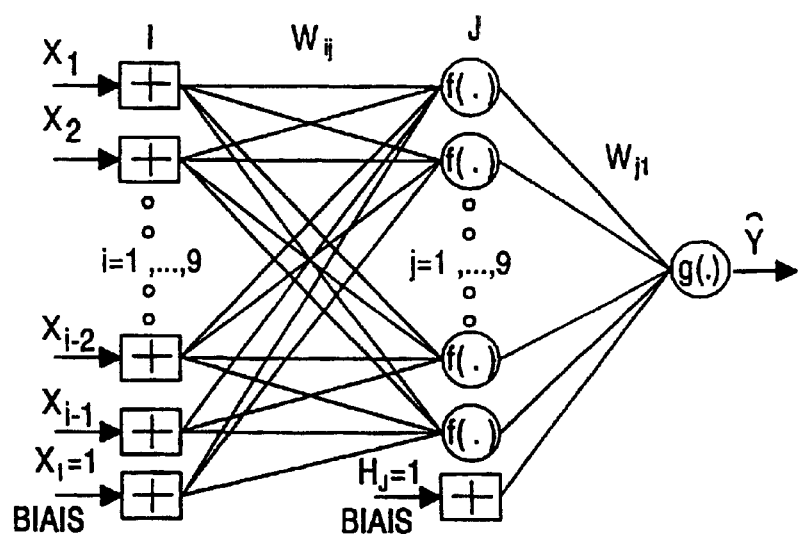
FIG. 8 is a schematic representation of the architecture of the predictive neural model of the invention.

The feedforward architecture used for the predictive network, as described in FIG. 8 has a window size of 8 values at the input layer. These values are:

Nodes 1 to 4: resistance values at times t, t–δ, T–2δ, T–3δ.

Nodes 5 and 6: feeding rates at times t, t–4δ.

Node 7: trend indicator for the cell's fast dynamics at time t.

Node 6: trend indicator for the cell's slow dynamics at time t.

This makes a total of 9 units at the input layer, the last unit corresponds to the bias. Therefore, in FIG. 8, I=9. Note that δ represents the control logic's action cycle which is also known as the decision-making interval, typically of a few minutes duration. The above window size results from a study of the auto- and intercorrelations between the cell's process variables measured in real time. The study revealed that a maximum intercorrelation (p=0.914) exists between feeding rate and cell resistance after 20 minutes, which roughly corresponds to the time for the alumina to dissolve in the bath under present conditions (dissolution time, in fact, depends on a number of parameters among which are the type of alumina, the concentration, the state of the bath, the cell operation). As a result of the cell's slow dynamics, the autocorrelation of cell resistance remains high (p=0.8) after 15 minutes. The two trend indicators of the resistance are also included in the set of input variables because they are among the basic decision variables required by the cell's control logic. The number of hidden neurons is also 8 (plus the bias to make a total of J=9); it is determined experimentally, using as criteria of choice the two quantities called prediction gain and prediction error, defined below and calculated over a time sequence of N=900 validation data:

$$\text{Gain} = \log_2 \frac{\sum_{t=1}^{N} Y^2(t)}{\sum_{t=1}^{N} (Y(t) - \hat{Y}(t))^2} \quad (2)$$

$$\text{Error} = \frac{1}{N}\left[\sum_{t=1}^{N} (Y(t) - \hat{Y}(t))^2\right] \quad (3)$$

The above two expressions apply to the present application case for which the network output is scalar. On-line adaptation of the weights is done using the back propagation algorithm with adaptive learning rate and momentum term as per the following equation (4), where α represents the learning rate, β represents the momentum, E(W) represents the prediction error and W represents the weights of the neural model.

$$w_{ij}^m = w_{ij}^{m-1} - \alpha^m \frac{\partial E(w)}{\partial w_{ij}} + \beta^m(w_{ij}^{m-1} - w_{ij}^{m-2}) \quad (4)$$

As the network is built to work in real time, two constraints are imposed on its on-line adaptation to avoid the sudden changes in the weights that may result from an assimilation of disturbances during learning:

With the cell's control logic working under the cell's nominal resistance plus or minus the deadband, if an anode adjustment occurs, the network is made "blind" for a time period, at the end of which the input vector is readjusted in accordance with the resistance values prevailing before and after the anode adjustment. The length of the required blind period is determined from the cell's dynamics and is in the order of a few minutes.

Before and after a weight adaptation, if the ratio between the two prediction errors exceeds a specified limit, the new weights are rejected.

Figure 9:
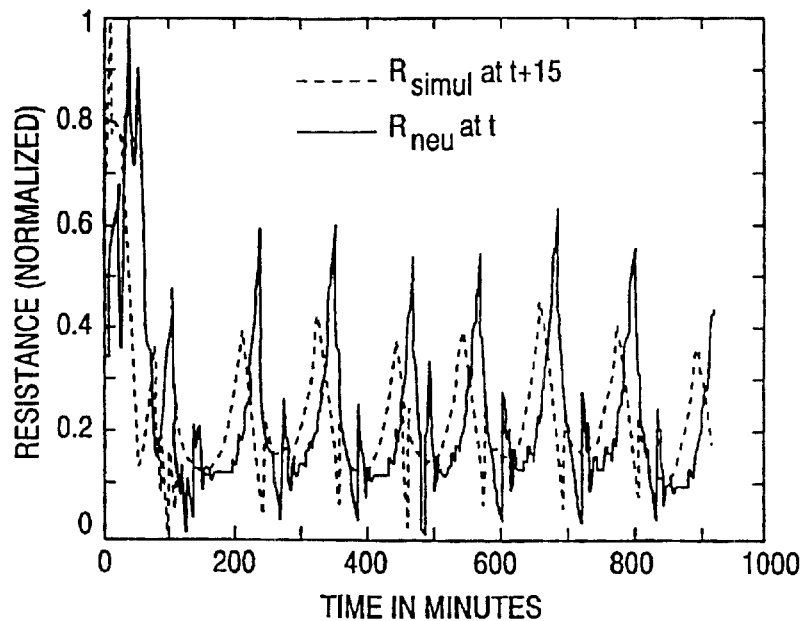
FIG. 9 is a graphical representation of the neural prediction of simulated resistance using the predictive neural network of the invention.

The network thus trained is tested in real time by having it integrated with the standard control logic and the cell simulator representing the real cell. Results of a 24-hour simulation are analyzed and network performance is evaluated by calculating the prediction gain and the prediction error; in this case the gain is 1.214 and the error is 0.005, which shows the capacity of the network to give accurate real-time prediction of the cell resistance 15 minutes into the future, even in the presence of anode adjustments (FIG. 9). The network has thus learned to predict the cell state several minutes in anticipation while maintaining the latest known states. This is important in view of the application of the network to the predictive control of the cell, from which the cell operators expectation is the prevention of critical situations such as anode effects.

Figure 10:
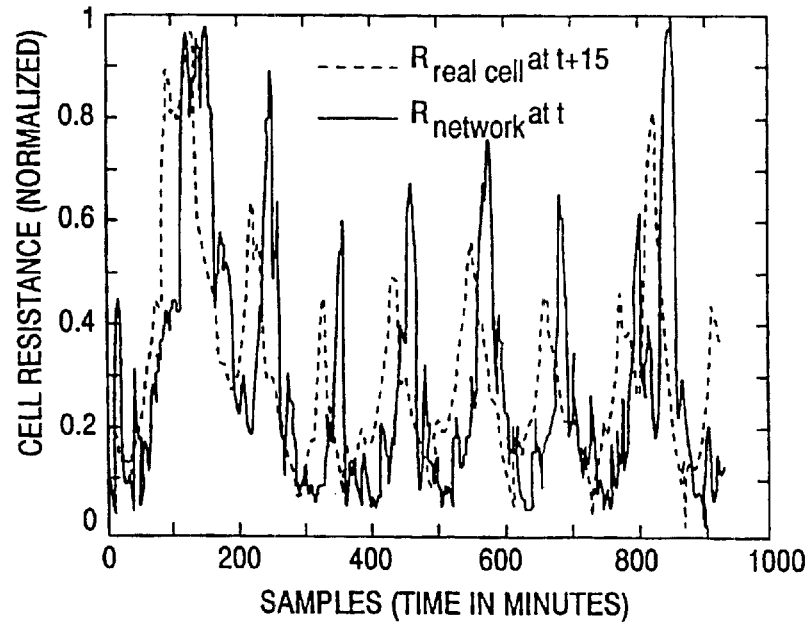
FIG. 10 is a graphical representation of the neural prediction of real cell resistance using the predictive neural network of the invention.

Next, without additional learning the network is tested on data taken from a real cell (as opposed to data from the cell simulator in the preceding case). The results, presented in FIG. 10, show that the network is capable of capturing the dynamics of the real cell and also reduce the noise level, and this is the essence of generalization. On the other hand, this test also serves as validation for the simulator by showing that the network, after learning with data provided by the simulator, can generalize to accommodate a real cell's dynamics. A small decrease in performance occurs as should be expected: the gain is now 1.136 and the error 0.0096. Some discrepancies are also noted in the magnitudes of peaks and the levels of irregularities; those discrepancies are expected to decrease and network performance increase if more learning is undertaken. Nevertheless it is not advisable to proceed much farther in that direction as this would be done at the expense of the network's capability to generalize. It is evident that network performance will improve further once it is integrated into the real process and starts learning on-line.

Prediction of the Index of Rapid Dynamics

The two trend indicators for cell resistance that characterize the slow and fast dynamics of the cell are important variables used in the decision making of the control logic to elaborate its control actions. Knowledge of the values of these indicators 15 minutes in advance allows the logic to decide on an anticipated action.

The index of the slow dynamic tendency is calculated in real time from minimal and actual average values of the resistance. The index of the tendency of the resistance which characterizes the rapid dynamics of the system constitutes a crucial parameter in making a decision by way of control logic to elaborate its command actions. To know the approximate value of this index, 15 minutes ahead of time, allows to provide the control logic with an anticipated action. The resistance of the bath is significantly noisy, and the variable with regard to the rapid dynamics is calculated based on the speed of its variation. It is, therefore, noisier, and the prediction is complicated. Thus, the construction of a neural network which predicts directly this variable does not seem sufficient.

The computation of the index of the rapid dynamic tendency of the real cell from predicted values of resistance, by way of one neural network, is shown in FIG. 1. This method gives a low prediction gain and a large error prediction (Gain=0.442, Error=0.048).

The poor performance of this method is the result of the fact that the index of the rapid dynamics is calculated from outputs from the neural network at different instants of sampling. The input data used by the neural network to calculate outputs are different. Thus the error and noise introduced at each sampling are cumulated and amplified. To remedy these limitations, with the data from the simulator, two neural networks were brought in, analogous to the first one, to predict the resistance of the cell over different periods (10 and 15 minutes). The index of the rapid dynamics is then calculated from the outputs of the two neuron-predictors at the same instant. The results obtained in this manner are better than the preceding one; this improvement of the network performance is shown by the gain and error of prediction (Gain=1.101 Error=0.010).

Table 4 summarizes the validation results of the prediction neural models on data from simulated and real cells. In both cases, and more particularly for the real cell, the precision of the prediction is clearly improved when the technique of two neural models is used. In the neural control described below, the control logic activates the rapid supply speeds when the predicted value is within a certain interval. Therefore, it is not mandatory to know the exact value of this tendency index.

TABLE 4

Validation of Prediction Models on the Data of Simulated and Real Cells

| Performance | Resistance | $\delta R\_1$ | $\delta R\_2$ |
| --- | --- | --- | --- |
| Gain (simulated cell) | 1.214 | 0.973 | 1.26 |
| Error (simulated cell) | 0.005 | 0.025 | 0.013 |
| Gain (real cell) | 1.136 | 0.442 | 1.101 |
| Error (real cell) | 0.009 | 0.048 | 0.010 |

$\delta R\_1$: the tendency index predicted by one neural model.
$\delta R\_2$: the tendency index predicted by two neural models.

Cell Control Using Neural Prediction of Decision Variables

In the present state of the art, the standard control logic makes use of the past and present values of the three decision variables (the cell resistance and the two trend indicators) to generate the required control actions. For various reasons related to the cell's state, its stability, the alumina feedstock, or a combination of those, the standard control logic cannot always prevent the anode effects. Thus, it was important to improve the performance of the standard control logic by providing it with predicted future values of the decision variables. This would allow the control logic to foresee a future state of the cell and generate anticipated actions to prevent the impending anode effects. The results obtained when such scheme is applied to the control of the cell in its various states demonstrates the viability of the present invention.

Figure 12:
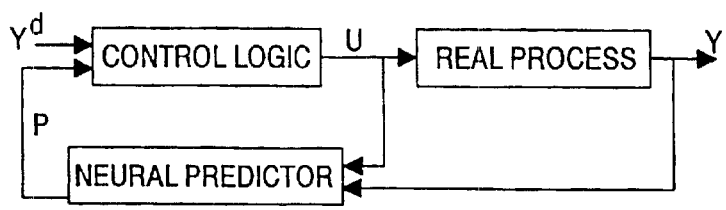
FIG. 12 is a schematic representation of the predictive control scheme of the invention using an internal neural model.

The overall control scheme used is best illustrated in FIG. 12. When the cell is nearing an anode effect its behavior can be described in different ways depending to a large extent on the way the resistance of the gas layer at the anode-bath interface evolves. For illustrative purpose three typical states of the cell are considered.

Figure 13:
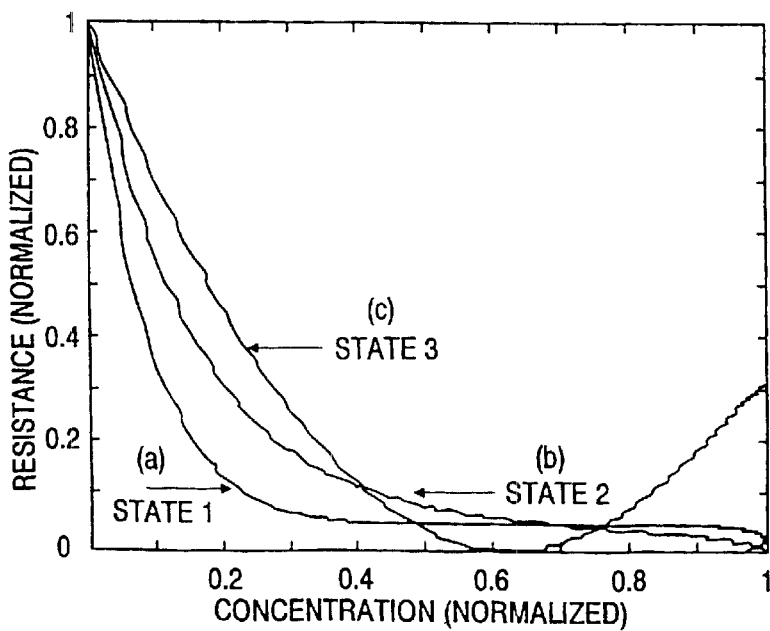
FIG. 13 is a graphical representation of the three typical cell states of the aluminum electrolytic cell.

These states are represented, respectively, by curves (a), (b) and (c) in FIG. 13. They correspond to three different expressions used in the simulator to describe resistance of the gas layer forming under the anode-bath interface, which implies for the cell three dynamic approaches, and three different approaches of the anodic effect. In the case of state 1, the function used is of a very pronounced exponential shape, given by the following equation:

$$R_{gaz}=a_0 \exp(b_0(c_0-c)) \tag{5}$$

In the case of state 2, the function is also exponential, but more moderate. It is given by the following equation:

$$R_{gaz}=a_1 \exp(b_1(c_1-c))+a_2 \exp(b_2(c_2-c)) \tag{6}$$

State 3 of the cell is represented by the parabola function given by the following equation:

$$R_{gaz}=a_3 c^2+b_3 c+c_3 \tag{7}$$

Parameters $a_i$, $b_i$, $c_i$ determine the speed and manner by which the anodic effect is approached. Variable c represents the concentration in the aluminum oxide bath.

By acting on the limits of the decision criteria applied by the standard control logic to trigger and maintain high-frequency feeding, the cell was overfed with alumina for three consecutive hours. The deadband was widened to four times its usual width in order to avoid the occurrence of anode adjustments. The cell thus enriched to nearly 4% (instead of the usual 2 to 3%) was subsequently submitted to underfeeding (feeding reduced to 50%) to induce anode effect. During underfeeding the limits of decision criteria of the standard control logic were changed so as to avoid the triggering of high-frequency feeding (overfeeding).

Anodic Effects Owing to Random Disturbances

The cell, in each of its three states, is ordered in a first series of simulations by the initial control logic (standard logic). In a second series of simulations, the neural prediction models of the decision variable are integrated into the standard logic to produce "neural logic." In each test, to simulate variations in the property of aluminum oxide, two different quantities of aluminum oxide were injected by dumps, following a decision of the control logic in operation. These values are respectively equal to the nominal value of the simulator (Q=3.0 kg/dump), or a reduced value (Q=2.4 kg/dump) or (Q=2.25 kg/dump) to induce anodic effects. To compare the two control versions, the average concentration of aluminum oxide ($c\mu$[%]), the power consumed by the cell ($P_{tot}$ [kW]), and the number of anodic effects occurring during the simulation were selected as performance indices.

State 1 Cell with a Steep Exponential Curve Shape

Figure 14:
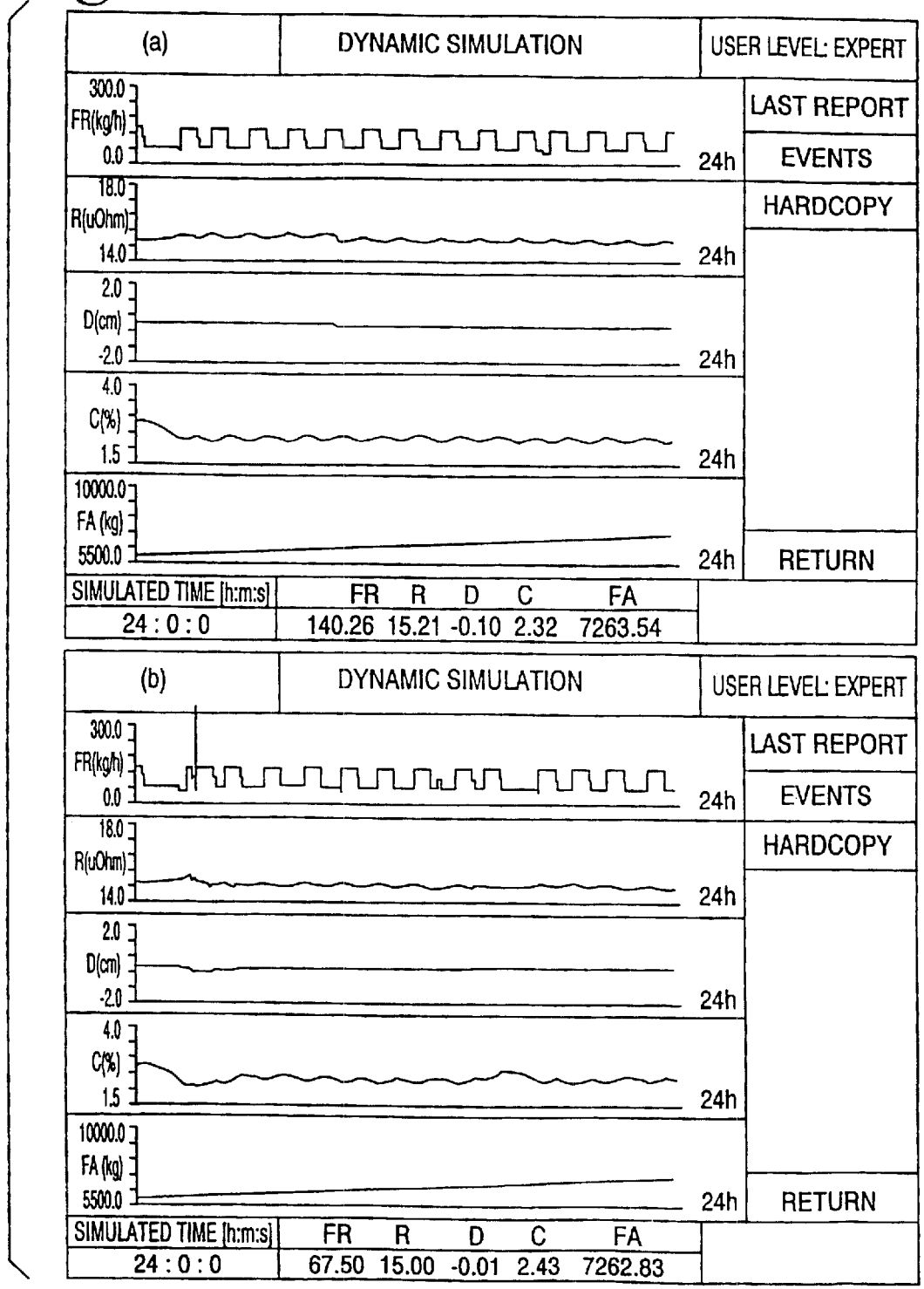
FIG. 14 is a graphical comparison of a cell in state 1 controlled by neural and standard logic controls using a nominal dump of alumina.

FIG. 14(a) shows a typical example of a simulation of a cell in standard control. The first control variable is the feed flow of aluminum oxide represented by the variable F R [kg/h]. The resistance of the cell R[$\mu\Omega$] constitutes the variable to be controlled. The anode-cathode distance, resulting from an anode movement is represented by the variable D[cm], constitutes the second control variable. Variables c[%] and F A [kg] represent, respectively, the concentration of the aluminum oxide bath and the amount of aluminum produced.

Figure 15:
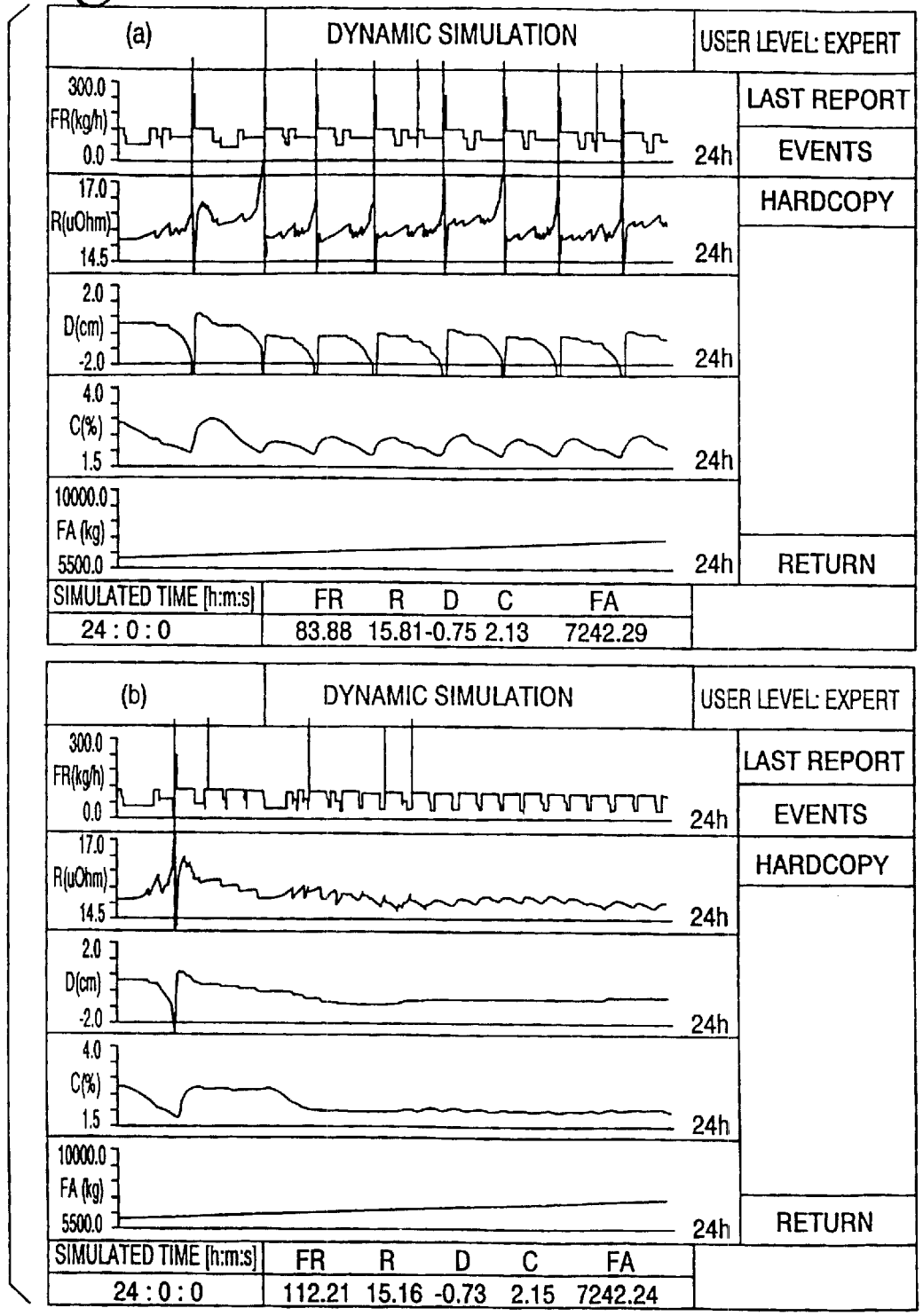
FIG. 15 is a graphical comparison of a simulation of a cell in State 1 controlled by neural and standard logic controls using a reduced aluminum oxide dosage.

Table (5) summarizes the results over a period of 24 hours of simulation when the two logics were applied to the cell in state 1, under nominal (3.0 kg/dump) and reduced (2.4 kg/dump) supplies. Under the nominal supply range, the two control logics were successful in avoiding anodic effects and gave similar performances as shown in FIGS. 14(a) and (b). Under the two control modes, the cell consumes almost the same amount of energy and operates under similar average concentrations. With the reduced supply range, the cell controlled by the standard logic is affected by a wave of eight anodic effects, while only one appears under the control of neural logic FIGS. 15(a) and (b). The energy consumed by the cell, under standard control, is high because of the series of anodic effects. A suppression of the anodic effects is done automatically by the control logic, by activating ranges of over-supply, and executing a series of movements of the anodes. The anodic effect which appears under the neural control is, therefore, a consequence of the initial states and the very pronounced exponential shape (FIG. 13) of the expression of formation of gas under the anode-bath interface, and not a characteristic of the dynamics of the cell controlled by neural logic. The speed with which the anodic effect appears does not allow time for the neural model to adapt its weights with regard to the dynamics of the system.

TABLE 5

Cell in State 1: Comparison Between the Standard and Neural logics with Nominal and Reduced Supply Dosages.

| Supply | Control logic | $c\mu$ [%] | $P_{tot}$ [kW] | Number of anodic effects | Time [h] |
|---|---|---|---|---|---|
| nominal (3.0 kg/dump) | standard | 2.38 | 763.33 | 0 | 24 |
| | neuron | 2.52 | 761.67 | 0 | 24 |
| reduced (2.4 kg/dump) | standard | 2.26 | 901.94 | 8 | 24 |
| | neuron | 2.25 | 781.39 | 1 | 24 |

State 2 Cell with a Smoother Exponential Curve Shape

Figure 16:
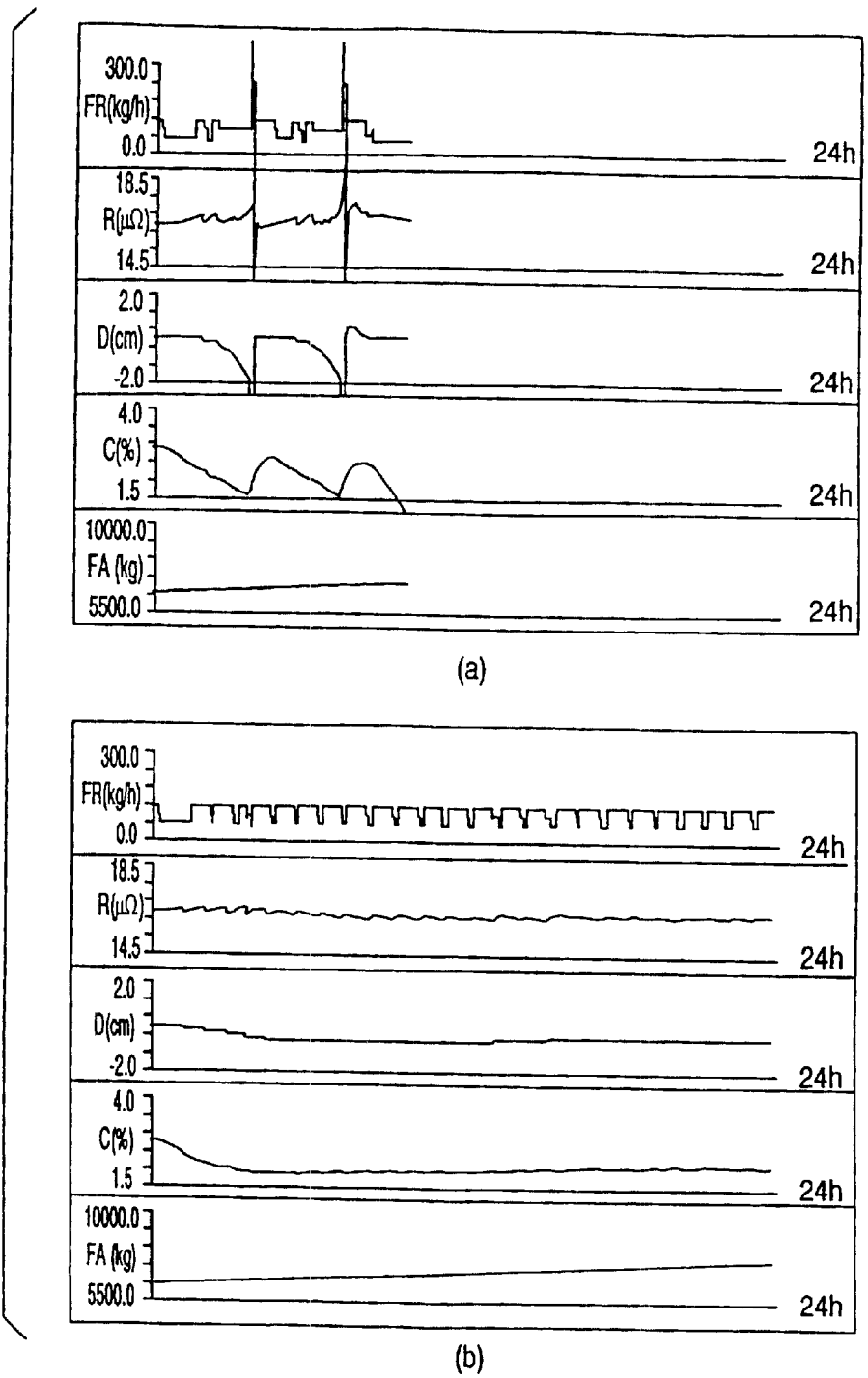
FIG. 16 is a graphical comparison of a simulation of a cell in State 2 controlled by neural and standard logic controls using a reduced aluminum oxide dosage.

This cell corresponds to Curve 2 of FIG. 13, which is less steep than Curve 1. Table 6 summarizes the simulation results. Here again, when the cell undergoes nominal feeding, the two control logics offer essentially the same performance during the 24-hour simulation. But under reduced feeding, as can be seen from FIGS. 16(a) and (b), the standard logic cannot prevent the anode effects whereas the neural logic can. With the standard logic, two anode effects occur within the first 10 hours of simulation. The simulation was ended after 10 hours instead of the usual 24 because of numerical overflow after two anode effects, however this was sufficient to prove the point. The neural logic-controlled cell operates with a low value of the mean concentration (2.08%) and yet succeeds in preventing the anode effects; this illustrates the robustness of the neuron predictive control scheme. Due to the moderate steepness of the characteristic curve (FIG. 13(b)) as compared to that of the cell state in (1), even the first anode effect did not occur. These data illustrate the surprising result that the power consumption is lower when the cell is under neural control logic. Finally, an average concentration is not calculated for the 10-hour simulations, because after removing the first 1 to 2 hours to discard the effect of initial conditions, the remaining time length is not sufficient to yield a representative mean value.

TABLE 6

Cell in state 2: Comparison Between the Standard and Neural logics with Nominal and Reduced Supply Dosages.

| Supply | Control logic | $c\mu$ [%] | $P_{tot}$ [kW] | Number of anodic effects | Time [h] |
|---|---|---|---|---|---|
| nominal (3.0 kg/dump) | standard | 2.26 | 802.78 | 0 | 24 |
| | neuron | 2.39 | 799.17 | 0 | 24 |
| reduced (2.4 kg/dump) | standard | — | 883.38 | 2 | 10 |
| | neuron | 2.08 | 796.97 | 0 | 24 |

State 3 Cell with a Parabolic Curve Shape

Curve 3 of FIG. 13 applies. Table 7 shows that under nominal feeding (3.0 kg/dump) both control logics yield similar performances over the 24-hour simulation period, without anode effects. The power consumptions and the average concentrations are similar under both control logics. Under reduced feeding (2.25 kg/dump) in the standard logic-controlled cell two anode effects occur within the first 10 hours of simulation, whereas the neural logic-controlled cell operates for 24 hours without anode effect. The reason for reducing the feeding to 2.25 kg/dump (instead of 2.4 kg/dump as previously) was to deliberately induce anode effects in the case of standard control logic. Also in this case, the simulation was ended after 10 hours to avoid numerical overflow. The neural logic-controlled cell operates with a low value of mean concentration (2.19%), and consumes less power than the standard logic-controlled cell. The simulation results are displayed in FIGS. 17(a) and (b) and Table 7.

TABLE 7

Cell in State 3: Comparison Between the Standard and Neural logics with Nominal and Reduced Supply Dosages.

| Supply | Control logic | $c\mu$ [%] | $P_{tot}$ [kW] | Number of anodic effects | Time [h] |
|---|---|---|---|---|---|
| nominal | standard | 2.99 | 786.24 | 0 | 24 |
| (3.0 kg/dump) | neuron | 3.09 | 785.89 | 0 | 24 |
| reduced | standard | — | 873.30 | 2 | 10 |
| (2.25 kg/dump) | neuron | 2.19 | 790.60 | 0 | 24 |

This study shows that a neural prediction contributes to the improvement of the control logic performance while avoiding anodic effects. This leads to a decrease in energy consumption, a better stability of the cell, and, therefore, an increase in its yield. The frequency of the anodic effects is decreased while operating on reasonable average concentrations.

Anode Effect Induced by Reducing Feeding Frequency and Duration.

The nominal frequency of point-feeding is readily obtained by dividing the nominal alumina consumption of the cell by the fixed amount of alumina injected per dump. A frequency higher than the nominal value results in overfeeding, a lower frequency causes underfeeding. A feeding strategy can be based on varying the frequency and the duration of the overfeeding and the underfeeding periods. In the following set of simulations, frequency and duration of feeding are gradually reduced to induce the anode effect.

State 1—Cell with a Steep Exponential Curve Shape

FIGS. 18(a), and (b) show the simulation results from a State 1 cell under standard and neural control logics, respectively. In the former, seven anode effects occur within a 24-hour simulation period whereas in the latter, only the first anode effect occurs. This occurrence of the first anode effect is due to reasons already mentioned. Also, for the neural logic-controlled cell, the average concentration is slightly lower and the power consumption decreases appreciably, as shown in Table 8.

TABLE 8

Comparing Standard and Neural Control Logics, for a State 1 Cell Under Reduced Feeding Frequency and Feeding Duration

| Control Logic | $C\mu$[%] | $P_{tot}$ [kW] | Number of anode effects | Time [h] |
|---|---|---|---|---|
| standard | 2.44 | 890.49 | 7 | 24 |
| neural | 2.21 | 780.14 | 1 | 24 |

State 2—Cell with a Smoother Exponential Curve Shape

Figure 19:
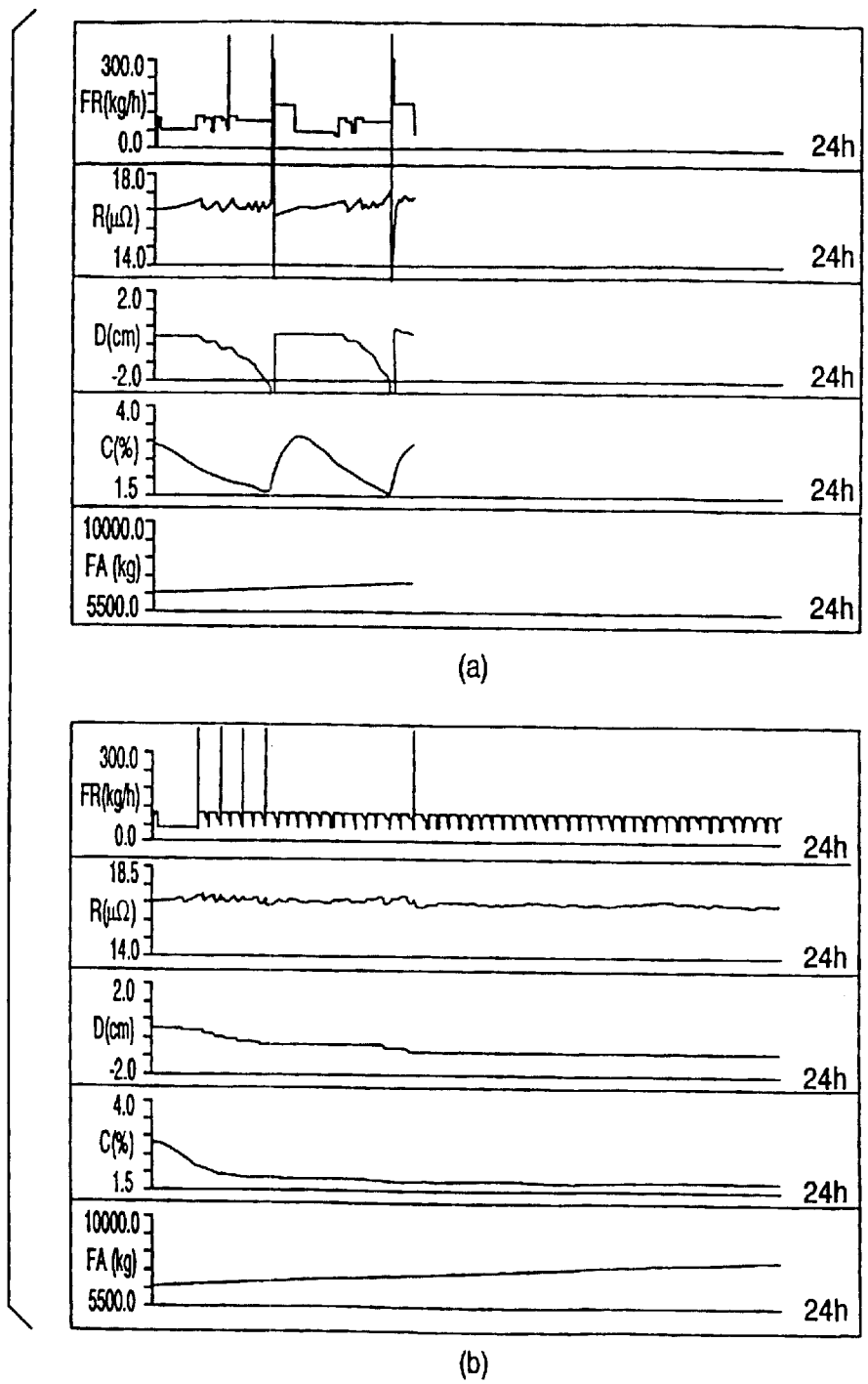
FIG. 19 is a graphical comparison of a simulation of a cell in State 2 under reduced feeding frequency and feeding periods, controlled by neural and standard logic controls.

The standard logic-controlled cell shows two anode effects in the first 10-hour simulation period, as shown in FIG. 19(a). In FIG. 19(b) the neural logic-controlled cell has no anode effect. This latter cell also shows a low average concentration and consumes less power, as shown in Table 9.

TABLE 9

Comparing Standard and Neural Control Logics, for a State 2 Cell Under Reduced Feeding Frequency and Feeding Duration

| Control Logic | $C\mu$[%] | $P_{tot}$ [kW] | Number of anode effects | Time [h] |
|---|---|---|---|---|
| standard | — | 881.70 | 2 | 10 |
| neural | 1.88 | 800.76 | 0 | 24 |

The fact that the cell displays a stable operation at a low concentration is a sign of the robustness of the neural control scheme.

State 3—Cell with a Parabolic Curve Shape

Figure 20:
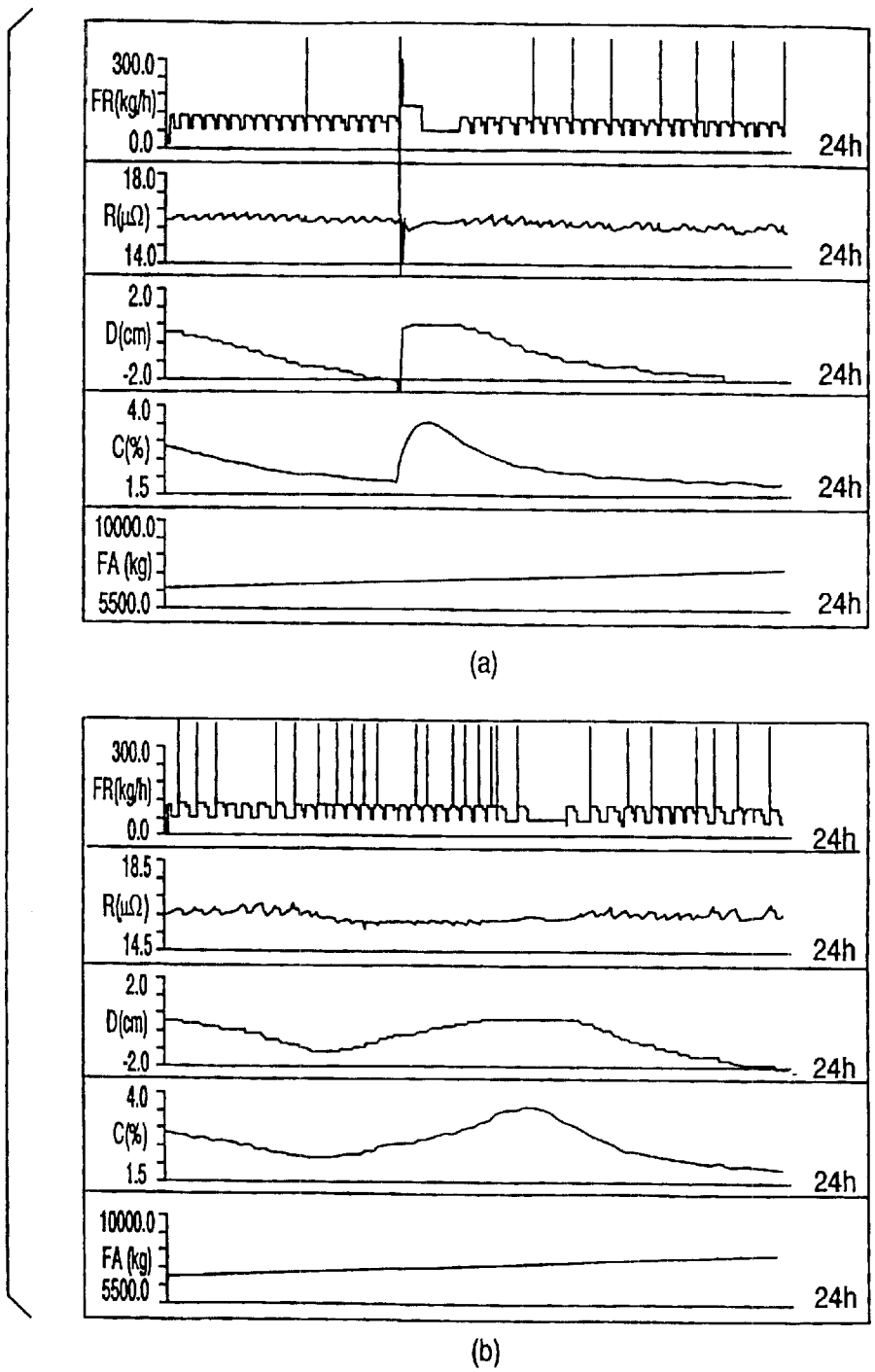
FIG. 20 is a graphical comparison of a simulation of a cell in State 3 under reduced feeding frequency and feeding periods, controlled by neural and standard logic controls.

FIG. 20(a) shows the results from a State 3 cell under standard control logic, displaying one anode effect. The cell was next simulated under neural control logic, and results showed that in this case, even neural control logic could not avoid the anode effect. This is believed to result from a combination of the following two reasons. First, the weights of the neural networks were obtained through previous learning based on data taken from cells whose characteristic curves were exponential (Curves 1 and 2 of FIG. 13), whereas in the present case the characteristic curve is parabolic (Curve 3 of FIG. 13). Also, the varying of feeding frequency and feeding duration per se constitutes a change in the present control logic as compared to the previous control logic (in which the amount of alumina injected per dump is varied). The combined effect of the two changes, one in the cell state and the other in the control logic, results in new dynamics to which the neural networks must learn to adapt themselves, and to do so additional real-time learning is required.

During this additional learning, the weights are adapted on-line until an anode effect is detected. The last weight values are saved and used in the subsequent simulation. This process is iterated until the anode effect disappears. In so doing, it took a total of nine simulations to allow the neural network to learn the new cell dynamics. The cell under neural control logic can then avoid all anode effects during a 24-hour simulation, as shown in FIG. 20(b). Also, Table 10 shows that under neural control logic, the cell operates at a near-optimal concentration of alumina, and consumes less power than under standard control logic.

TABLE 10

Comparing Standard and Neural Control Logics with Additional Learning, for a State 3 Cell Under Reduced Feeding Frequency and Feeding Duration

| Control Logic | $C\mu$[%] | $P_{tot}$ [kW] | Number of anode effects | Time [h] |
|---|---|---|---|---|
| standard | 2.30 | 806.33 | 1 | 24 |
| neural | 2.56 | 788.42 | 0 | 24 |

Control of the Concentration Based on the Recognition of the States

To be efficient, the control of alumina feeding of the electrolytic cell must be based on cell resistance, alumina concentration and cell state. Most control schemes now in use are based on cell resistance only, and thus constitute an open-loop control that lacks robustness because their decision criteria are not explicitly tied to concentration or cell state. This results in the cell operating at sub-optimal conditions, diminishing cell efficiency. An optimal operation requires the knowledge of alumina concentration and an adjustment of the decision criteria as a function of alumina concentration. In this invention, a LVQ-type neural network was built and trained to recognize the cell state. Knowing the state of the cell and its resistance, alumina concentration can be estimated using predetermined regression functions. The decision criteria for the control logic are then consequently adapted, and a closed-loop scheme is obtained. With the cell control thus structured, the cell can operate at or near optimal conditions and concentrations independently of its state. This flexible and intelligent character of the neural control of the invention provides a considerable advantage as compared to the standard control.

The adaptation procedure of the decision criteria of the control logic is the following:

- From the characteristic curves corresponding to each cell state, determining the regression function giving the concentration as function of cell resistance.
- Training a neural network of the Learning Vector Quantization (LVQ) type, to recognize the present state of the cell, based on its characteristic curve.
- Knowing the cell's present state and its resistance, estimating the concentration value using the corresponding regression function.
- From a predetermined register, choosing the decision criteria to be applied.

The control scheme is not dependent on knowledge of a precise knowledge of the concentration, but rather the recognition of the present state of the cell and of its degree of richness or poorness in alumina.

Determination of Regression Function for Each Cell State

Starting with each of the three cell states described previously, the cell controlled is simulated by its standard control logic and undergoing an overfeeding period followed by underfeeding. The overfeeding period was made long enough to allow the concentration values to cover the whole range of interest. The underfeeding period was also maintained long enough to bring the cell into an anode effect. The deadband was widened to avoid anode movements. Deadband is the tolerance zone of the cell resistance value within which a resistance variation does not result in an anode adjustment.

From the data obtained by simulation, a regression function is determined giving the concentration as function of the cell resistance for each of the three cell states. The following functions are obtained:

$$c = a_0 \log(R-a_1) + a_2 \quad (8)$$

$$c = b_0 \log(R-b_1)/b_2) + b_3 \log((R-b_4)/b_5) + b_6 \quad (9)$$

$$c = \pm \sqrt{-(R/c_1 + c_2) + c_3} \quad (10)$$

Figure 21:
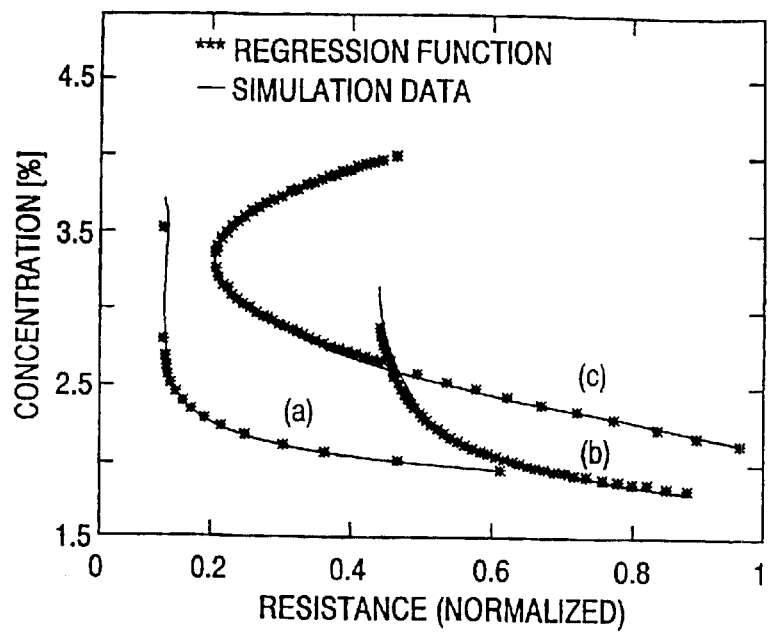
FIG. 21 is a graphical representation of the three regression functions for the three cell states.

The variables c and R represent the concentration and the cell resistance respectively. The parameters $a_i$, $b_j$, $c_k$ are identified through the least square method. On FIG. 21, for each cell state, the smooth lines show the simulation data and the asterisks give the regression function values. Note that for the case of State 3 corresponding to Eq. (10), in the simulation as well as in the real physical process, the maximum alumina concentration is about 4% (see FIG. 21); the regression function of Eq. (10) yields concentrations above that value, but these have been ignored.

State Recognition by LVQ Network

During each control cycle, the pattern presented to the neural network belongs to one of three classes representing, respectively, states 1, 2 and 3 of the cell. This results in the choice of a supervised classification algorithm, in the preferred embodiment, a "LVQ"-type of neural network (Learning Vector Quantization). The learning of the network is done "off-line," because the categories formed during the learning remain stable, but the preparation of the pattern to be presented at each control cycle is done in real time.

Figure 22:
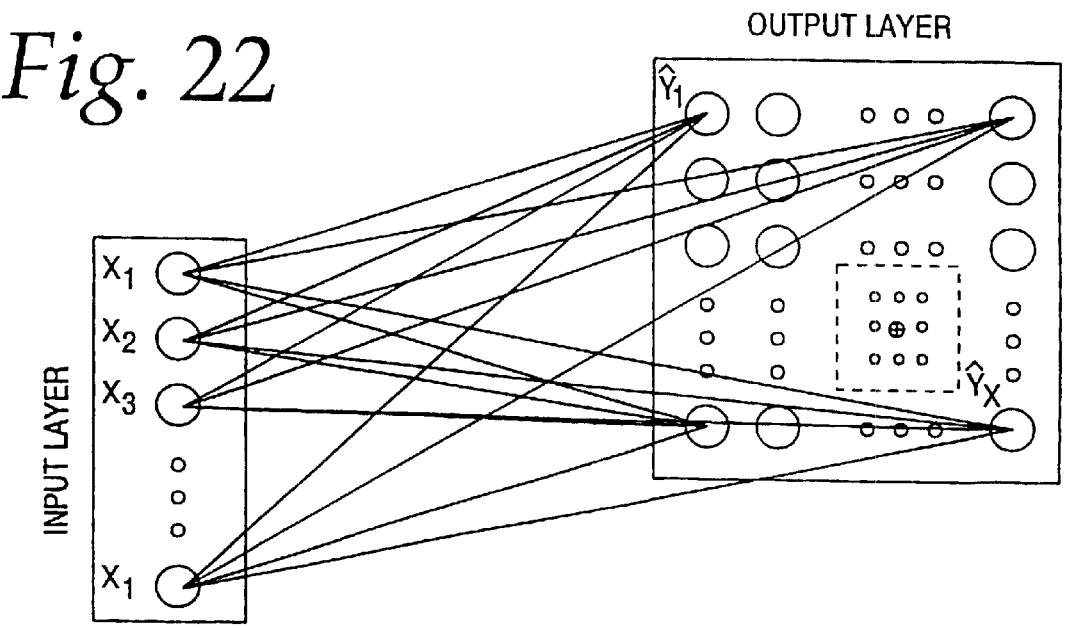
FIG. 22 is a schematic representation of the self-adaptive topological map of the LVQ network model used in the invention.

The LVQ network model is a model made of two layers, an input layer that stores the pattern and an output layer that classifies it. The basic algorithm for this program is well known in the art. In this model, the two layers are completely interconnected as shown in FIG. 22. The output layer is organized to form a topological map of the input patterns. It is generally represented by a two-dimensional table where the adjacent neurons within a given neighborhood share the similar properties of the input patterns.

The LVQ network model is based on supervised learning. The space formed by the input vectors (patterns) is split into regions, each represented by a reference pattern. The class to which each pattern belongs is known a priori, and this is what makes the learning program a supervised one. One suitable learning program for this invention comprises the basic algorithm as will as a weight adaptation algorithm based on the rule of competitive learning in which only the weights of the neuron with the highest level of activation are adapted.

In this invention, we have trained and validated an LVQ model network to recognize the present state of the cell using the same input vector used by the neuro-predictor model.

Neural Control of Concentration

In a first series of simulations, the cell, in each of its three states and under the control of its standard control logic, is simulated. In a second series, the neural model for state recognition is integrated into the standard logic, and the decision criteria are changed to fit the needs of each cell state. Each simulation is carried out over a 24-hour period. The standard control logic activates the overfeeding of the cell if $\delta R > \delta R_c$ or if $\Delta R > \Delta R_c$, independently of the value of the concentration c; in fact, the latter is not even known to the control logic. In other words, for the standard control logic the nominal critical values of the decision variables are held fixed at $\delta R_c$ and $\Delta R_c$. With a neural control logic that can recognize the cell state, these critical values for decision, instead of being held rigid, can be modified for each of the cell states recognized. Note that the numerical values of $\delta Rc$ and $\Delta R_c$—a fraction of a $\mu\Omega$ each—may vary from one facility to the next, and their knowledge is not required for the comprehension of the concepts conveyed by this text.

Control of Cell in State 1

For the purpose of comparing the neural logic with the standard logic, the following modified decision criteria for activating the overfeeding of the cell is applied to the former logic:

$$\begin{aligned}
&\text{if } c < 1.8 &&\delta Rc \Rightarrow 0.6\,\delta R_c, &&\Delta R_c \Rightarrow \Delta R_c \quad (11)\\
&\text{if } 1.8 \le c \le 2.0 &&\delta Rc \Rightarrow \delta R_c, &&\Delta R_c \Rightarrow \Delta R_c\\
&\text{if } c > 2.0 &&\delta Rc \Rightarrow 10\,\delta R_c, &&\Delta R_c \Rightarrow \Delta R_c
\end{aligned}$$

These constraints stipulate that the neural logic operates identically to the standard logic for concentrations between 1.8% and 2.0%, but near an anode effect, when the concentration goes below 1.8%, the criterion on $\delta R_c$ is tightened ($\delta Rc \to 0.6\ \delta R_c$). On the other hand, when the concentration goes above 2.0%, the criterion on $\delta R_c$ is considerably relaxed ($\delta R_c \rightarrow 10\, \delta R_c$) to avoid the activation of overfeeding.

Figure 23:
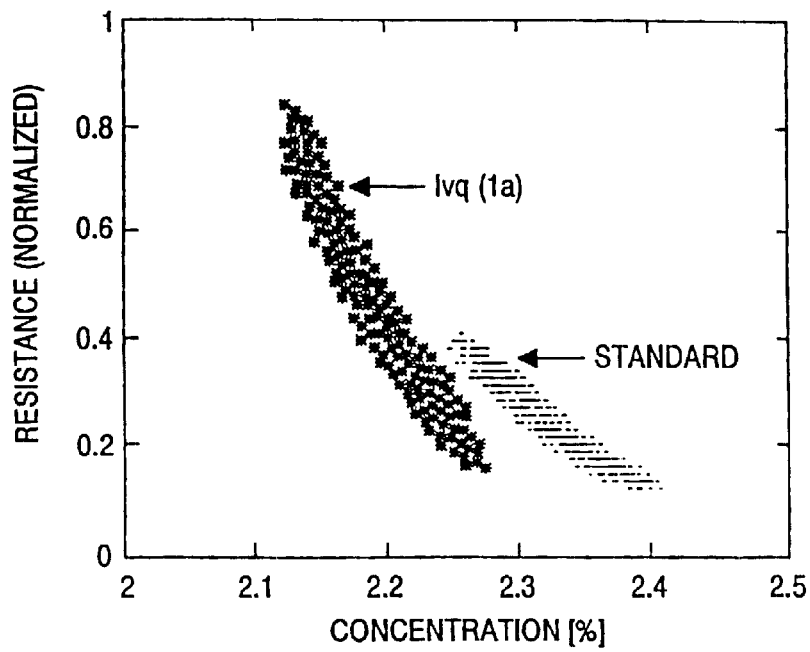
FIG. 23 is a graphical representation of a cell in State 1 controlled by standard and neuron (LVQ) logics with variable decision criteria.

The conditions of decision criteria set 11 force the cell to operate at low concentrations as shown in Table 11. Under neural control, the cell, on the one hand operates at an average alumina concentration lower than the one obtained with standard logic, and on the other hand, succeeds in operating without anode effects at a minimal alumina concentration 2.083%. FIG. 23 shows that the slope of resistance controlled by neural logic, band (Ivq (1a)), is larger than the one obtained with standard logic. In fact, by operating at low concentrations, between 2.083% and 2.275%, the cell is more sensitive, and, therefore, the control is improved.

Each point on FIG. 23 represents a pair of resistance and concentration values prevailing at sampling instant. The data point agglomeration is the result of alternating between the over-supply and under-supply ranges. This occurrence leads to a cyclical character, oscillations between two limit values, of the resistance and concentration. Because of the very marked exponential shape of the curve which characterizes this state, two areas of operation can be distinguished between: one corresponding to standard control and the other to the neural control.

Control of Cell in State 2.

For illustrative purpose the following decision criteria are first imposed to the neural logic:

$$\begin{aligned}
&\text{if } c < 2.4 && \delta Rc \Rightarrow 0.4\,\delta R_c, && \Delta R_c \Rightarrow 0.25\,\Delta R_c \\
&\text{if } 2.4 \leq c \leq 2.8 && \delta Rc \Rightarrow 0.6\,\delta R_c, && \Delta R_c \Rightarrow 0.50\,\Delta R_c \\
&\text{if } c > 2.8 && \delta Rc \Rightarrow 0.8\,\delta R_c, && \Delta R_c \Rightarrow 0.75\,\Delta R_c
\end{aligned} \quad (12)$$

The above criteria stipulate three pairs of critical values for three different ranges of concentrations. Note that for all three ranges, overfeeding is activated for critical values lower than those applied to the standard logic. As a result, and this can be seen from the middle part of Table 11 at line Ivq (2a), the cell operates at an average concentration higher than that of the standard control. To bring the cell to operate at a lower concentration, the neural logic is now submitted to the following criteria:

$$\begin{aligned}
&\text{if } c < 2.0 && \delta Rc \Rightarrow 0.6\,\delta R_c, && \Delta R_c \Rightarrow 0.50\,\Delta R_c \\
&\text{if } 2.0 \leq c \leq 2.4 && \delta Rc \Rightarrow \delta R_c, && \Delta R_c \Rightarrow 1.25\,\Delta R_c \\
&\text{if } c > 2.4 && \delta Rc \Rightarrow 10\,\delta R_c, && \Delta R_c \Rightarrow 1.50\,\Delta R_c
\end{aligned} \quad (13)$$

It can be seen on Table 11 at line Ivq (2b), that under neural control, with the above criteria the cell operates without anode effect with a minimum concentration of 1.828%, and an age concentration of 1.972%, which is lower than that obtained with the standard logic.

TABLE 11

Comparison Between Standard Control and Neural control with Cell State Recognition Model

| Cell State | Control Logic | $C_{min}[\%]$ | $C_{max}[\%]$ | $C\mu[\%]$ |
|---|---|---|---|---|
| 1 | standard | 2.236 | 2.410 | 2.318 |
|   | neuron Ivq (1a) | 2.083 | 2.275 | 2.181 |
| 2 | standard | 1.967 | 2.262 | 2.156 |
|   | neuron Ivq (2a) | 2.167 | 2.318 | 2.239 |
|   | neuron Ivq (2b) | 1.828 | 2.131 | 1.972 |
| 3 | standard | 2.826 | 3.038 | 2.940 |
|   | neuron Ivq (3a) | 2.857 | 3.118 | 3.011 |
|   | neuron Ivq (3b) | 2.476 | 2.716 | 2.588 |
|   | neuron Ivq (3c) | 1.965 | 2.521 | 2.169 |

Figure 24:
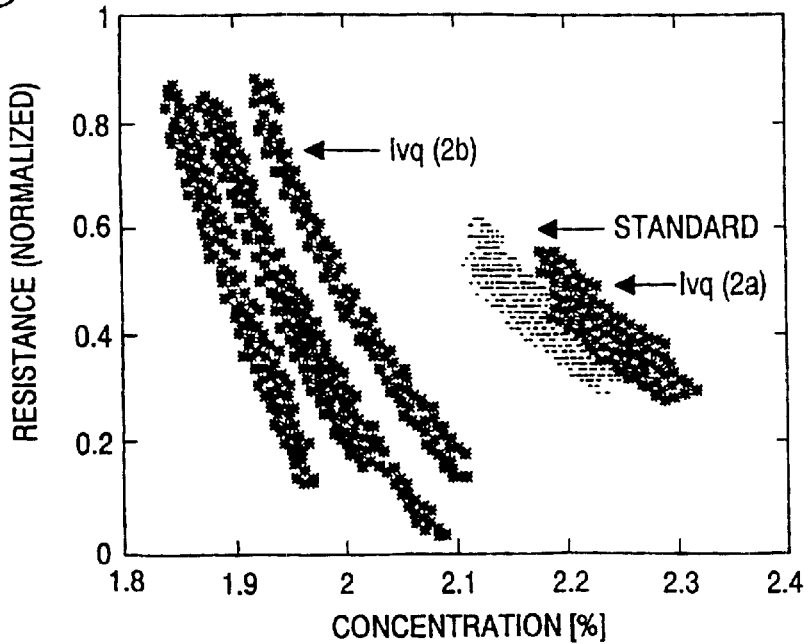
FIG. 24 is a graphical representation of a cell in State 2 controlled by standard and neuron (LVQ) logics with variable decision criteria.

FIG. 24 shows that when the cell operates at low concentrations—see the band identified as Ivq (2b)—the slope of the characteristic curve is noticeably steeper than in the case of higher concentrations—see band Ivq (2a). Indeed, when operating at low concentrations between 1.828% and 2.131%, the cell is more sensitive and a better control is obtained. However, in this zone the control logic generates more anode movements, which result in sudden changes, therefore discontinuities, in the cell resistance. This translates into the discontinuities (the white strips dividing the band) observed on the band identified as Ivq (2b). Note that bands Ivq (2a) and Ivq (2b) of FIG. 24 are generated by the decision criteria (12) and (13) respectively.

Because of the moderate exponential shape of the curve characterizing this state, three areas of operation can be distinguished: standard, Ivq(2a) and Ivq(2b)—see FIG. 24.

Control of Cell in State 3

The three following sets of decision criteria are imposed to the neuron-controlled cell successively. This is to allow the cell to operate at decreasing concentration levels.

$$\begin{aligned}
&\text{if } c < 2.0 && \delta Rc \Rightarrow 0.6\,\delta R_c, && \Delta R_c \Rightarrow 0.50\,\Delta R_c \\
&\text{if } 2.0 \leq c \leq 3.0 && \delta Rc \Rightarrow 0.6\,\delta R_c, && \Delta R_c \Rightarrow 0.75\,\Delta R_c \\
&\text{if } c > 3.0 && \delta Rc \Rightarrow \delta R_c, && \Delta R_c \Rightarrow \Delta R_c
\end{aligned} \quad (14)$$

$$\begin{aligned}
&\text{if } c < 1.8 && \delta Rc \Rightarrow 0.6\,\delta R_c, && \Delta R_c \Rightarrow \Delta R_c \\
&\text{if } 1.8 \leq c \leq 2.0 && \delta Rc \Rightarrow \delta R_c, && \Delta R_c \Rightarrow \Delta R_c \\
&\text{if } c > 2.0 && \delta Rc \Rightarrow 10\,\delta R_c, && \Delta R_c \Rightarrow \Delta R_c
\end{aligned} \quad (15)$$

$$\begin{aligned}
&\text{if } c < 1.8 && \delta Rc \Rightarrow 0.6\,\delta R_c, && \Delta R_c \Rightarrow \Delta R_c \\
&\text{if } 1.8 \leq c \leq 2.0 && \delta Rc \Rightarrow 2.0\,\delta R_c, && \Delta R_c \Rightarrow 1.5\,\Delta R_c \\
&\text{if } c > 2.0 && \delta Rc \Rightarrow 10\,\delta R_c, && \Delta R_c \Rightarrow 2.0\,\Delta R_c
\end{aligned} \quad (16)$$

Figure 25:
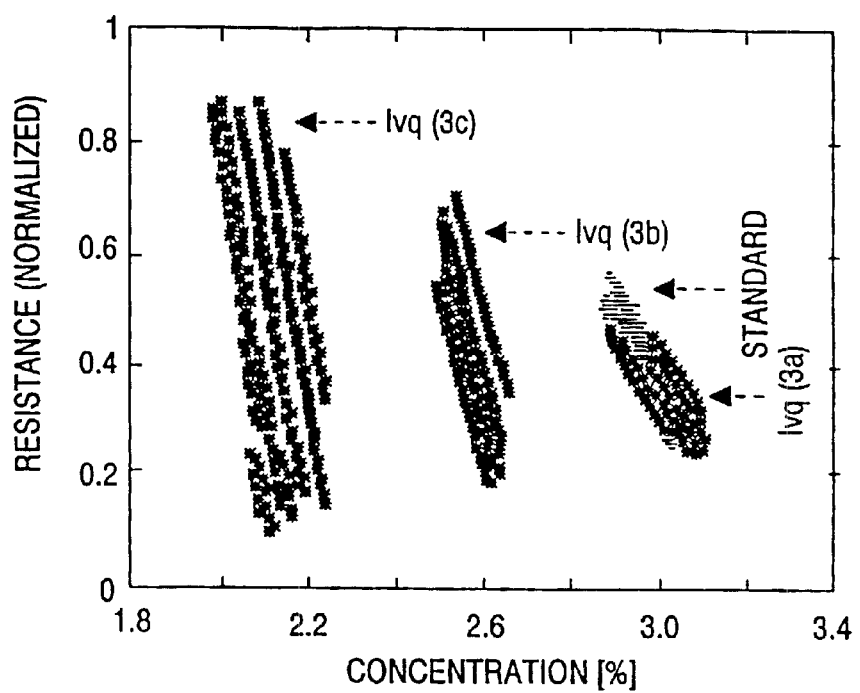
FIG. 25 is a graphical representation of a cell in State 3 controlled by standard and neuron (LVQ) logics with variable decision criteria.

The above criteria amount to imposing critical values below or equal to their nominal values for high concentrations (Eq. (14)), and increasing them gradually for lower concentrations. The last part of Table 11 summarizes the simulation results. The decision criteria (14), (15) and (16) enable the cell under neural control to operate at average concentrations of 3.011%, 2.588% and 2.169% respectively. Criteria (16) results in the cell operating without anode effect at a minimum concentration of 1.965% whereas for the standard control logic it is 2.826%. Similarly to the preceding cases, FIG. 25 shows that for lower concentrations, the sensitivity of the cell resistance increases and as a consequence, the quality of cell control improves. The bands identified as Ivq (3a), Ivq (3b), Ivq (3c) of FIG. 25 are generated by the criteria (14), (15) and (16) respectively. In this case, due to the parabolic form of the characteristic curve (FIG. 13) four operation zones can be clearly recognized on FIG. 25: standard, Ivq (3a), Ivq (3b) and Ivq (3c).

According to the invention, by adding a neural model for the recognition of the cell's state, a close-loop structure, flexible and intelligent, can be given to the standard control logic. Feeding of the cell is no longer modulated merely as function of the variations in cell resistance but also as function of alumina concentration and cell state.

Cell state depends on a number of parameters describing the operational conditions of the cell. Among the three typical cell states chosen for study in FIG. 13, one could be seen as the normal state (State 2) whereas the other two could be seen as cell conditions drifting in two opposite directions. Table 11 shows that under standard logic, the normal cell operates at an average concentration of 2.156%. The latter increases to 2.318% and 2.940% in the other two cases. Thus, for cell states other than normal, the standard logic tends to "play it safe" by operating at higher concentrations in order to steer clear from anode effects. This behavior of the standard logic is quite understandable when one considers that, as often confirmed by cell operators, about half of the anode effects occur due to poor alumina feedstock. This precaution can be removed when the control logic is reinforced by a state recognition model. A code book of decision criteria can be elaborated to cover all the typical cell states and the concentration values. The state recognition model, combined with the code book of decision criteria, is-then incorporated in the control logic to enable it to operate near an optimal regime whatever the cell state happens to be.

Thus, by giving to the control logic a close-loop structure through cell state recognition, better cell control can be achieved due to the knowledge of the cell state and the alumina concentration. The improvement appears evident when such a control scheme is compared with the one in which operators control cell feeding using the decision criteria based on cell resistance alone, without the knowledge of concentration. Trying to control the concentration while not knowing the present value of concentration is indeed a delicate situation. With an open-loop structure, large disturbances can cause the cell to drift away from its nominal state and operate at concentrations either too low or too high, potentially leading to anode effects or sludge formation, respectively. This shows the importance of recognizing the present operational state of the cell, and therefore recognizing the applicable characteristic curve (FIG. 13), so that a concentration value of the cell could be estimated from its resistance. The previously rigid decision criteria $\delta R_c$ and $\Delta R_c$ can then be adapted so as to avoid activating the overfeeding when the cell is in the alumina-rich zone of the curve, and on the other hand, these criteria can be tightened as the cell moves toward the alumina-poor zone. Better control may result in better cell stability, lower power consumption, higher productivity and longer cell life.

It should be understood that various changes and modifications to the preferred embodiment described herein will be apparent to those skilled in the art. Such changes and modifications can be made without departing from the spirit and scope of the present invention and without diminishing its attendant advantages. It is intended that such changes and modifications be within the scope of the claims.

What is claimed is:

1. A method for closed loop control of an electrochemical cell having an electrolytic bath resistance, a rate of change over time of the resistance and at least one cell condition, each condition having a characteristic curve described by a non-linear regression function, comprising the steps of:
   a. using a neural network with a predictive algorithm to predict the bath resistance and its rate of change over time;
   b. using a neural network with a pattern-recognition algorithm to recognize the condition of the cell, wherein each condition is identified with a codebook of associated triggers;
   c. deducing the alumina concentration in the cell on a real-time basis from the resistance and the nonlinear regression function associated with the characteristic curve; and
   d. using the neural networks to operate a closed-loop feeding control mechanism for the cell whereby a controller controls the rate at which a reactant is fed into the electrolytic bath.

2. The method of claim 1 wherein the cell condition is identified by measuring the concentration of a reactant in the electrolytic bath and the resistance of the electrolytic bath.

3. The method of claim 2 wherein cell is an aluminum electrochemical cell and the reactant is alumina.

4. The method of claim 3, further including the steps of
   a. applying a decision criteria to the control logic; and
   b. adjusting the decision criteria to maintain an approximately optimal concentration of alumina in the cell.

5. The device of claim 4 wherein the electrochemical cell produces aluminum.

6. The device of claim 3 wherein the reactant is alumina.

7. The method of claim 1, wherein the feeding control logic controls the cell based upon the resistance of the electrolytic bath and the concentration of the reactant in the electrolytic bath.

8. The method of claim 1, wherein the set of decision criteria have the following rule:
   a. at low alumina concentration, the decision criteria are tightened, or
   b. at high alumina concentration, the decision criteria are relaxed.

9. A device for controlling an electrochemical cell having an electrolytic bath and a cell condition comprising:
   an algorithm for predictive control of the cell; and
   an algorithm for pattern-recognition control of the cell; and
   a neural network which utilizes the pattern-recognition algorithm to recognize and identify the cell condition;
   a neural network which utilizes the predictive algorithm to predict the cell resistance and the rate of change of the resistance over time; and
   a controller for controlling the rate at which reactant is fed into the cell, wherein the controller comprises a feeding control logic, and further wherein the feeding control logic utilizes at least pattern-recognition and predictive control methods.

10. The device of claim 9 wherein the condition of the cell is identified in real time.

11. The device of claim 9 wherein the reactant is alumina.

12. The device of claim 11 wherein the electrochemical cell produces aluminum.

13. The device of claim 9 wherein the electrochemical cell produces aluminum.

14. The device of claim 8 wherein the cell condition is identified in real-time.

15. The device of claim 9 wherein the reactant is alumina.

16. A device for closed-loop control of the production of aluminum in electrochemical cells having a resistance and a cell condition comprising:
   a neural network for predictive control of the resistance of the cell;
   a neural network for pattern-recognition control of the condition of the cell;
   a feeding control logic controlled by the neural networks; and
   a controller for controlling the rate of addition of a reactant to the cell according to the feeding control logic;
wherein the resistance and the cell condition change over time and wherein the controller controls the cell to operate efficiently independent of the condition of the cell by using non-linear regression functions to deduce the concentration of reactant in the cell and using the predicted resistance and the condition of the cell to control the feeding of the cell in sufficient time to optimize the feeding by optimizing the reactant concentration in the cell.

17. The device of claim 16 wherein the controller controls the cell to minimize anode effects and sludge formation while controlling the cell to operate at near-optimal aluminum concentration.

18. A method for determining the optimal alumina concentration in a cell having a cell condition that changes over time during the electrochemical production of aluminum comprising the steps of:
   training a neural network to utilize pattern-recognition and predictive control techniques to control a feeding control logic for the cell; and
   using the feeding control logic to continuously maintain an optimal concentration of aluminum in the cell, independent of the cell condition.

19. A device for closed-loop control of an electrochemical cell having an electrolytic bath containing a reactant, and a cell condition, the device comprising:
   a neural network for predictive control of the cell which predicts future values of resistance in the cell and the rate of change of the resistance over time;
   a neural network for pattern-recognition control of the cell which recognizes the present condition of the cell;
   output from both neural networks;
   a codebook of triggers, cell conditions and reactant concentrations; and
   a controller for controlling the rate at which reactant is fed into the cell, wherein the controller utilizes a feeding control logic, the codebook and the output.

20. The device of claim 19 wherein the reactant is alumina.

21. A controller for controlling the rate at which a reactant is fed into an electrochemical cell comprising the steps of:
   identifying a set of typical conditions in the electrochemical cell;
   measuring the resistance and alumina concentration for each of the conditions;
   plotting the curves characteristic of each condition;
   associating a nonlinear regression to each curve;
   training a first neural network to predict future values of the resistance in the cell and the rate of change over time of the resistance;
   training a second neural network to recognize the present condition of the cell;
   establishing a codebook of triggers, cell concentrations and alumina concentrations to be used by a control logic; and
   utilizing the first and second neural networks, the codebook and the control logic to control the electrochemical cell.

22. The device of claim 21 wherein the reactant is alumina.

23. A method for determining the optimal alumina concentration in an electrochemical cell having a cell condition during the electrochemical production of aluminum comprising the steps of:
   training a first neural network to predict values of the cell resistance and a second neural network to recognize the present condition of the cell;
   identifying typical conditions of an aluminum electrochemical cell and associating a characteristic curve to each cell condition;
   associating a nonlinear regression function to each curve from which the resistance versus alumina concentration may be determined;
   establishing a codebook of triggers, cell conditions and alumina concentration;
   using the neural networks, the codebook and a control logic to perform closed loop control of the cell under low, medium and high alumina concentrations;
   comparing the performance of the cell under the low, medium and high alumina concentrations; and
   determining the optimal operational value of the alumina concentration in the cell.

24. A method for closed loop control of an electrochemical cell for producing aluminum, comprising the steps of:
   using two levels of control, a first control level comprising predicting a cell resistance and its rate of change over time, a second control level comprising recognizing at least one cell condition, each condition having a characteristic curve described by a non-linear regression function;
   estimating a real-time alumina concentration from the non-linear relationship of resistance versus alumina concentration;
   establishing a set of decision criteria based on the cell condition, the estimated alumina concentration and the predicted values of the cell resistance and its rate of change over time; and
   feeding alumina into the electrolytic bath based on the set of decision criteria.

25. A device for controlling an electrochemical cell having an electrolytic bath resistance and a cell condition comprising:
   means for predicting the cell resistance and its rate of change over time;
   means for recognizing the cell condition; and
   means for feeding a reactant into the electrolytic bath based on a set of decision criteria, wherein the set of decision criteria are based on the cell condition, an estimated real-time reactant concentration, and the predicted values of the cell resistance and its rate of change over time, and wherein the real-time reactant concentration is estimated from a non-linear relationship of the cell resistance versus reactant concentration.

26. A device for controlling an electrochemical cell having an electrolytic bath resistance and a cell condition comprising:
   a first neural network that predicts the cell resistance and its rate of change over time;
   a second neural network that recognizes and identifies the cell condition; and
   a feed controller that sets the rate at which a reactant is fed into the cell, wherein the feed controller comprises a feed control logic, and wherein the feed control logic utilizes at least the first and second neural networks.

* * * * *

UNITED STATES PATENT AND TRADEMARK OFFICE
CERTIFICATE OF CORRECTION

PATENT NO.       : 6,609,119 B1
APPLICATION NO.  : 09/335062
DATED            : August 19, 2003
INVENTOR(S)      : Abdelhamid Meghlaoui It is certified that error appears in the above-identified patent and that said Letters Patent is hereby corrected as shown below:

IN THE SPECIFICATION:

In Column 3, line 28, change "duration However" to --duration. However--.

In Column 3, line 41, change "a" to --an--.

In Column 5, line 2, change "depends" to --depend--.

In Column 8, line 5, change "$R=\frac{v-v}{I}$" to -- $R=\frac{v-v_o}{I}$ --.

Figure 11:
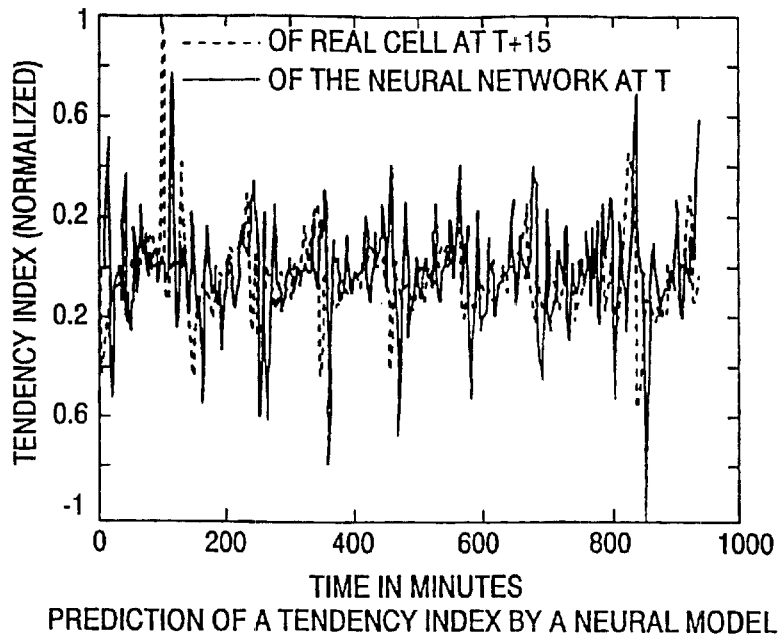
FIG. 11 is a graphical representation of the prediction of the rapid dynamic tendency by the predictive neural network of the invention.

In Column 17, line 50, change "FIG. 1" to -- FIG. 11--.

In Column 23, line 53, change "$C = \pm\sqrt{-(R/C_{C_{1+C2)+C3}}}}$" to
-- $c = \pm\sqrt{-(R/c_1 + C_2) + C_3}$ --.

In Column 24, line 49, change "µΩeach" to --µΩ each--.

In Column 24, line 67, change "→" to -- ⇒--.

In Column 25, line 2, change "→" to -- ⇒--.

In Column 25, line 11, change "Ivq (1a)" to --lvq (1a)--.

In Column 25, line 41, change "Ivq (2a)" to --lvq (2a)--.

In Column 25, line 51, change "Ivq (2b)" to --lvq (2b)--.

In Column 25, line 63, Table 11, change "Ivq (1a)" to--lvq (1a)--.

In Column 25, line 65, Table 11, change "Ivq (2a)" to --lvq (2a)--.

In Column 25, line 66, Table 11, change "Ivq (2b)" to --lvq (2b)--.

In Column 26, line 8, Table 11, change "Ivq (3a)" to --lvq (3a)--.

In Column 26, line 9, Table 11, change "Ivq (3b)" to --lvq (3b)--.

In Column 26, line 10, Table 11, change "Ivq (3c)" to --lvq (3c)--.

UNITED STATES PATENT AND TRADEMARK OFFICE
CERTIFICATE OF CORRECTION

PATENT NO. : 6,609,119 B1
APPLICATION NO. : 09/335062
DATED : August 19, 2003
INVENTOR(S) : Abdelhamid Meghlaoui It is certified that error appears in the above-identified patent and that said Letters Patent is hereby corrected as shown below:

IN THE SPECIFICATION: (Cont'd)

In Column 26, line 13, change "Ivq (2b)" to --lvq (2b)--.

In Column 26, line 15, change "Ivq (2a)" to --lvq (2a)--.

In Column 26, line 22, change "Ivq (2b)" to --lvq (2b)--.

In Column 26, line 23, change "Ivq (2a)" to --lvq (2a)--.

In Column 26, line 23, change "Ivq (2b)" to --lvq (2b)--.

In Column 26, line 27, change "Ivq (2a)" to --lvq (2a)--.

In Column 26, line 27, change "Ivq (2b)" to --lvq (2b)--.

In Column 26, line 57, change "Ivq (3a)" to --lvq (3a)--.

In Column 26, line 57, change "Ivq (3b)" to --lvq (3b)--.

In Column 26, line 57, change "Ivq (3c)" to --lvq (3c)--.

In Column 26, line 61, change "Ivq (3a)" to --lvq (3a)--.

In Column 26, line 61, change "Ivq (3b)" to --lvq (3b)--.

In Column 26, line 61, change "Ivq (3c)" to --lvq (3c)--.

IN THE CLAIMS:

In Claim 5, Column 28, line 14, change "4" to --6--.

In Claim 6, Column 28, line 16, change "3" to --25--.

In Claim 8, Column 28, line 21, change "1" to --24--.

In Claim 12, Column 28, line 46, change "11" to --15--.

In Claim 14, Column 28, line 50, change "8" to --26--.

UNITED STATES PATENT AND TRADEMARK OFFICE
CERTIFICATE OF CORRECTION

PATENT NO. : 6,609,119 B1
APPLICATION NO. : 09/335062
DATED : August 19, 2003
INVENTOR(S) : Abdelhamid Meghlaoui It is certified that error appears in the above-identified patent and that said Letters Patent is hereby corrected as shown below:

IN THE CLAIMS: (Cont'd)

In Claim 15, Column 28, line 52, change "9" to --26--.

In Claim 21, Column 29, line 53, change "concentrations" to --conditions--.

In Claim 23, Column 30, line 11, change "concentration" to --concentrations--.

Signed and Sealed this

Eleventh Day of December, 2007

JON W. DUDAS
*Director of the United States Patent and Trademark Office*